United States Patent [19]

Wetzel et al.

[11] Patent Number: 5,579,071
[45] Date of Patent: Nov. 26, 1996

[54] CAMERA STABILIZING SUPPORT

[75] Inventors: Donald E. Wetzel, Arcadia, Calif.; Garrett W. Brown, 515 Addison Ct., Philadelphia, Pa. 19147; James M. Bartell, Long Beach, Calif.

[73] Assignee: Garrett W. Brown, Philadelphia, Pa.; a part interest

[21] Appl. No.: 215,357

[22] Filed: Mar. 21, 1994

[51] Int. Cl.$^6$ ............................................. G03B 17/00
[52] U.S. Cl. ........................ 396/428; 354/82; 352/243
[58] Field of Search .......................... 352/243; 354/81, 354/82, 293; 348/373, 376; 294/139; 248/280.11, 281.11, 123.2

[56] References Cited

U.S. PATENT DOCUMENTS

| | | | |
|---|---|---|---|
| Re. 32,213 | 7/1986 | Brown | 352/243 |
| 1,040,575 | 10/1912 | Pieper | 248/281.11 |
| 1,246,859 | 11/1917 | Boyd | 248/454 |
| 1,255,185 | 2/1918 | Lehmkuhl | 248/282.1 |
| 2,007,215 | 7/1935 | Remey | 248/694 |
| 3,409,261 | 11/1968 | Leporati | 248/586 |
| 3,995,797 | 12/1976 | Knight | 248/184.1 |
| 4,156,512 | 5/1979 | Brown | 248/586 |
| 4,158,488 | 6/1979 | Gottschalk et al. | 352/243 |
| 4,158,489 | 6/1979 | Gottschalk et al. | 352/243 |
| 4,158,490 | 6/1979 | Gottschalk et al. | 352/243 |
| 4,166,602 | 9/1979 | Nilsen | 248/280.1 |
| 4,206,983 | 6/1980 | Nettman et al. | 352/243 |
| 4,208,028 | 6/1980 | Brown et al. | 352/243 X |
| 4,394,075 | 7/1983 | Brown et al. | 352/243 |
| 4,474,439 | 10/1984 | Brown | 352/243 |
| 4,591,122 | 5/1986 | Kreuzer | 248/280.1 |
| 4,685,649 | 8/1987 | McKay | 248/594 |
| 4,852,842 | 8/1989 | O'Neill | 248/280.1 |
| 4,867,405 | 9/1989 | Nakamura | 248/281.1 |
| 4,976,387 | 12/1990 | Spianti | 224/262 |
| 5,037,053 | 8/1991 | Fox et al. | 248/278 |
| 5,042,763 | 8/1991 | Wong | 248/178 |
| 5,213,293 | 5/1993 | Muentener et al. | 248/123.1 |
| 5,340,072 | 8/1994 | Halbirt | 248/279 |
| 5,348,260 | 9/1994 | Acevedo | 248/280.1 |
| 5,360,196 | 11/1994 | DiGiulio et al. | 352/243 X |
| 5,435,515 | 7/1995 | DiGuilio et al. | 248/576 |

FOREIGN PATENT DOCUMENTS

| | | |
|---|---|---|
| 0048404 | 3/1982 | European Pat. Off. . |
| 2188907 | 1/1974 | France . |
| 2359361 | 2/1978 | France . |
| 2380492 | 9/1978 | France . |
| 691797 | 10/1979 | U.S.S.R. . |
| 944564 | 12/1963 | United Kingdom . |
| WO8806695 | 9/1988 | WIPO . |
| WO9407180 | 3/1994 | WIPO . |

*Primary Examiner*—Howard B. Blankenship
*Attorney, Agent, or Firm*—Weiser & Associates, P.C.

[57] ABSTRACT

A camera stabilizing support apparatus includes motorized "x-y translation" of one or more components of the camera equipment, such that no mechanical forces are imparted to the overall system which would adversely affect the angular position of the gimbaled mass, synchronous control of the motion of lower masses of the camera stabilizing support apparatus so that both dynamic and static balance is preserved throughout the range of motion, and an adjustable gimbal mechanism which serves to isolate the system's equipment support from the support arm extending from the operator's body harness which provides both coarse and fine location adjustment, and provides positive self-centering for these gimbal locking elements so that no clamp distortion occurs.

53 Claims, 16 Drawing Sheets

CAMERA STABILIZING SUPPORT

BACKGROUND OF THE INVENTION

The present invention relates generally to body-mounted camera stabilizing devices which are adapted to isolate devices such as a camera from the unwanted angular and spatial motions of an ambulatory operator. This is done to permit smooth moving camera shots over rough ground, up stairs, and the like.

Such devices are generally comprised of a camera equipment support structure, gimbaled at its center of gravity and supported by an equipoising structure attached to a vest worn by the operator. Camera stabilizers of this kind have long been in use and have become a staple of the motion picture and video industries. The Steadicam® camera stabilizing device received an Oscar in 1978. This device is described in U.S. Pat. Nos. Re. 32,213; 4,156,512; and 4,474,439. A support arm for use in conjunction with this device is further described in U.S. Pat. Nos. 4,208,028 and 4,394,075. For further details, reference is made to these patents, which are incorporated by reference as if fully set forth herein.

Camera stabilizers such as these typically employ a three-axis gimbal at the point of attachment to the camera equipment support structure which provides the desired degree of isolation from the operator. It is necessary to position the camera components and their support structure (i.e., camera equipment) such that the static center of gravity of all of the components is located approximately at the common centers of rotation of the axes of the gimbal. The relatively massive camera is itself counterbalanced by the other (rigidly attached) components, and is supported in approximately neutral balance. The camera can thus be aimed in any direction by a slight pressure of the hand adjacent to the gimbal. The directions of these aiming motions are distinctly referred to as pan, tilt and roll.

As used herein, "roll" is defined as rotation about an axis parallel to that of the camera's lens. "Tilt" refers to rotation about an axis which is horizontal, but offset 90° from the axis of the lens. "Pan" means rotation about an axis parallel to that of "true vertical" (i.e., rotation around a line to the gravitational center of the Earth, which is not necessarily related to the momentary tilt angle of the camera, which may then be tilted).

To achieve an enhanced result, the present invention includes improvements to several aspects of the camera equipment support structure. The support structure (also known as the "sled") includes improvements to its so-called upper stage (the top portion of the camera support which includes camera attaching hardware and means for adjusting the camera's fore-and-aft and/or side-to-side position), to its lower portions (which include the video monitor, the battery, their attaching hardware, and the associated electronics and wiring), and to its support structures (including the center post, gimbal and handgrips). Also provided are improvements in the handgrip associated with the gimbal, on the operator's side, and the center post and gimbal which support the "sled".

For some time, the technique of operating camera stabilizing supports has been refined so that a skilled practitioner can make and control rapidly panning shots. As the speed of this rotation increases (at times beginning from rest, sweeping 180° or more, and coming to a stop in less than a half second), the dynamic balance of the spinning mass becomes crucial to retaining control over the camera's attitude at the end of the pan. Consequently, an important goal is to help operators with the complex requirements of dynamic balance. Various articles have been published describing empirical methods for achieving dynamic balance in order to permit operators to make such rapid pans without gyroscopic "precession" which can cause the camera to seek a different tilt or roll angle when spun. Articles have also been published setting out the mathematical basis for the dynamic balance of a camera stabilizing support, including G. Brown, "Trim", Steadicam Letter, Vol. 1, No. 1 (Spring, 1988), and A. DiGiulio, "Trim-II, The Sequel", Steadicam Letter, Vol. 1, No. 2 (Summer, 1988), which are incorporated. by reference as if fully set forth herein. A number of modifications and after-market accessories have also been developed to permit the lower sled components to move into the positions required for dynamic as well as static balance of the system.

Unfortunately, the average operator still generally relies on guessing or trial and error (with empirical "spin-test" rigs) to achieve this desirable condition. What is more, any subsequent change to the camera equipment configuration, such as raising the monitor, not only degrades dynamic balance but also alters static balance. This requires the operator to raise or lower the vertical position of the gimbal to restore balance. Neither the few operators who are comfortable with the empirical balancing methods, nor the fewer yet who understand the mathematics involved, have the time necessary to deal with problems of dynamic balance in the middle of a "shoot". The addition and removal of accessories still further complicates the situation. As a result, and most of the time, such camera stabilizing supports are not dynamically balanced, and are therefore liable to precession during rapid panning shots.

The technique of operating camera stabilizing supports has also been refined so that a skilled practitioner can execute moving shots which may be indistinguishable from those made with wheeled camera dollies. However, the hardware itself has only been improved incrementally. For example, U.S. Pat. No. 4,474,439 discloses a sled having additional flexibility for arranging the camera equipment components in order to execute various kinds of shots, and various practitioners have improved upon its ease of use. However, a number of quite fundamental operating problems relating to the structure of these devices still have not been fully resolved.

One important goal is to help operators with the frequent requirement for "trimming" of the camera. Adjusting the position of one or more components of the gimbaled camera equipment will alter its nominal balanced angle. Trimming currently requires touching the gimbaled mass of the camera equipment (which is freely rotatable in three axes), which inevitably causes it to swing back and forth. As a result, the operator must make an adjustment, counteract the camera's induced (unwanted) motions by hand, and wait for the system to settle down to ascertain if the adjustment has had the desired effect (such as to level the camera, or otherwise alter its angle). Any attempt to manually "trim" the camera's balance during a shot results in unwanted angular motions that are easily visible when viewing the results. Operators have therefore had to make do during a shot with a preselected, fixed "trim" and have had to work against the unit's fixed trim during any portion of the shot that required a different camera attitude.

Also to consider is that camera stabilizing supports exhibit a moment of rotational inertia in their pan axis, based upon the fore-aft distribution of the system's masses. This value is not subject to the operator's control, despite the fact that certain shots (such as slow moving shots with a minimum of panning) would benefit by the ability to increase this moment to provide greater inertia, and thus, stability. On the contrary, rapidly panning shots would benefit by a reduction in the moment of rotational inertia to reduce the torque needed to rapidly spin and/or stop spinning this relatively large mass.

An exact, "neutral" balance of the camera equipment is seldom employed by operators because it provides no tendency to cause the camera equipment to remain upright, and therefore requires constant vigilance in order to keep the camera level in the roll axis. This means that attention would have to be diverted from the content of the shot to accomplish this task. In practice, it has been found that displacement of the center of gravity slightly downward from the center of the gimbal (typically accomplished by raising the gimbal about one-quarter inch up the center post which connects the top and bottom masses of the camera equipment) provides a very slight bottom-heaviness which causes the camera to weakly seek a level attitude in tilt and roll. This arrangement has been found convenient, and contributes to the operator's ability to repeatably execute shots.

If, in addition, the camera's fore-aft balance is altered (e.g., offset slightly forward from the level neutral position), it will have a tendency to remain tilted slightly downwardly throughout the shot. This fore-aft balance can be adjusted to help preserve a desired tilt angle, and seek a given framing (i.e., "headroom" for an actor following at a given distance). Unfortunately, this also cannot be accomplished during shooting. The camera equipment is so freely balanced that even a light touch by the operator or an assistant (anywhere other than adjacent the gimbal, at the center of gravity), would disturb the shot. For this reason, camera assistants generally employ radio-controlled servo motors to adjust the camera lens (or other parameters) so as not to touch the camera. It has been found that even light gauge wires connected to the camera will exert an undue influence and reduce the operator's independence of motion.

Problems arise when a shot requires a series of complex moves which include serial changes in the camera's desired tilt. Once again, operators had to select a single trim setting (which could not be changed while shooting) in order to accommodate the most difficult section of the shot (such as a long hold at the end, or a block or two of walking just ahead of an actor). When changes in the tilt angle were required, the operator had to maintain a continuous pressure on the "handle" section of the center post in order to maintain this different angle. When extremes of tilt are serially required, portions of shots inevitably included some visible spurious motion.

These variations in the amount of force required to maintain tilt angles that were not "trimmed-for" often produced slight "swimming" motions (up and down) and also degraded the operator's control of the remaining axes.

Another problem for operators of these devices relates to the difficulty in maintaining the camera level enough so that the framing is correct relative to vertical objects seen in the background of the shot. Although a slightly bottom-heavy camera equipment will tend to seek level when the camera is stationary, it is nevertheless pendular and will react to lateral accelerations and decelerations with a slight tendency to depart from level. This must again be counteracted with subtle hand pressure on the "handle" portion of the support. Incorrect compensation yields shots which are sometimes mis-framed or off-level. In any event, it is a compromising arrangement. The level-seeking properties are desirable, but considerable skill is required to deal with the pendular consequences.

Attempts have been made to adapt wireless control of the camera's "roll" attitude (e.g., by a motorized roll-cage swivelled to permit a second party to slowly "bank" the camera during a tracking shot) to simulate flight. Attempts have also been made to automate camera leveling responsive to an electronic level sensor (e.g., by tilting the camera itself to compensate for an off-level condition of the camera support). However, the degree of tilt had to be tuned to each individual camera weight and shape, and such efforts proved to be unproductive. In order to overcome the imbalance caused by the lateral shifting of film weight in co-axial film magazines, attempts have been made to compensate for translations of weights and/or camera equipment using clockworks or motors and lead screws. These efforts also proved to be unproductive because the required rate of movement tends to vary according to the prevailing degree of bottom-heaviness of the gimbaled camera equipment.

Further complicating matters is that operators have not been able to achieve precisely graduated, or even repeatable alterations of the camera equipment's degree of bottom-heaviness. The principal reason for this is that the gimbal is traditionally fixed to the center post of the camera stabilizing support with a clamp. To change the location of the gimbal, the operator needed to loosen the clamp while holding the equipment in a sideways attitude so that the freed gimbal would not slide uncontrollably to one end or the other of the post. Once the gimbal was moved, the clamp was re-tightened and the usual test (the "drop" test) was performed to check for the pendular period of the gimbaled mass. Most film cameras employ a vertical film transport, within the magazine, which shifts about 1.5 pounds of film downwardly about four inches during the average four-minute duration of a film magazine. To date, it has not been practical, or even possible to accurately compensate for the resulting, progressive increase in bottom-heaviness.

In addition, shots that require extreme tilts are easier with less bottom-heaviness. Straight-ahead, level shots or shots made in windy conditions are more stable with more bottom-heaviness. Extendable center posts have been used to provide additional length for counterbalancing even the heaviest of cameras. However, each change in post length requires an adjustment of the gimbal to re-establish balance. Each change of the lens (from a light to a heavy lens) alters the degree of bottom-heaviness, as well. All of these situations would ordinarily indicate a need to adjust (move) the gimbal. However, too often, operators must endure inappropriate degrees of bottom-heaviness to save time and effort.

Also to consider is that prior gimbals employed two large rotational bearings, with the yoke pivot bearings located within the yoke ring. This caused the yoke ring structure to be of a size that prevented the operator from grasping the gimbal more closely to the center of gravity. In addition, previous gimbals suffered from inexact centering due to the distorting nature of the clamping mechanism. Inexact centering can cause the camera to change its angle slightly as its orientation relative to the operator varies.

SUMMARY OF THE INVENTION

It is therefore the primary object of the present invention to provide an improved apparatus for augmenting the capabilities of body-mounted camera stabilizers.

It is also an object of the invention to provide a system for preserving both the dynamic and static balance of the camera equipment when camera components such as the monitor or battery are moved.

It is also an object of the invention to provide a system for opposing the unbalancing effects of movement of a component by the coordinated proportional movement of a complementary component, to retain dynamic and static balance of the camera equipment.

It is also an object of the invention to provide an adjustable system for readily increasing or decreasing the moment of rotational inertia of the gimbaled mass of the camera equipment, while preserving both its dynamic and static balance.

It is also an object of the invention to provide a system for improving the trimming and balancing capabilities of body-mounted camera stabilizers.

It is also an object of the invention to provide for motorized displacement of one or more camera components to alter the nominal balance of the gimbaled camera support.

It is also an object of the invention to provide a wireless system for altering the trim, or pendular camera attitude, while a shot is in progress and without the need to touch or otherwise affect the gimbaled mass.

It is also an object of the invention to provide the operator with a wireless system for altering the side-to-side trim of a gimbaled film camera, while shooting, to compensate for sideward weight shifts caused by the transfer of film from the "feed" side to the "take-up" side of a co-axial magazine.

It is also an object of the invention to provide an efficient, motorized x-y stage for adjusting the camera position relative to the camera equipment support.

It is also an object of the invention to provide for electronic level-sensing to automatically displace one or more camera equipment masses in order to bias the camera to desired positions.

It is also an object of the invention to provide a system for manual, coarse and fine adjustment of the position of the gimbal relative to the camera equipment support.

It is also an object of the invention to improve the operator's access to the center of gravity of the camera equipment support.

It is also an object of the invention to improve the mechanical centering and rotational registration of the gimbal bearing, and of the center post and its telescopic extension post relative to the gimbal bearing, and to provide for manual adjustment of the post extension.

These and other objects are achieved in accordance with the present invention by providing for improved adjustment of the camera stabilizing support apparatus.

This can include motorized "x-y translation" of one or more components of the camera equipment, such that no mechanical forces are imparted to the overall system which would adversely affect the angular position of the gimbaled mass. In this fashion, the system can be adjusted by an operator, even while shooting. If desired, the system can be selectively interconnected with onboard level sensor outputs, for purposes of automated adjustment.

This can also include controlling the relative motion of at least two masses of the camera stabilizing support apparatus so that both dynamic and static balance is preserved throughout the range of motion, and by providing a novel mechanism for automatically moving the system's components in a synchronous manner according to the locations desired for them. To this end, and in a preferred embodiment, the system's onboard video monitor (the operator's viewfinder) and the onboard battery are the masses selected for coordinated translational movement, although other system components can be adjusted to achieve a similar result.

This can also include enhanced adjustment of the gimbal which serves to isolate the system's equipment support from the support arm extending from the operator's body harness. To this end, a ball and detent structure is provided which permits a course adjustment of the location of the gimbal relative to the system's extension post. The gimbal also has an inner sleeve which is manually threaded for movement relative to the outer handle portion, to permit a fine (micrometer) adjustment of the location of the gimbal along the post. The adjustment mechanism provides positive self-centering for these gimbal locking elements so that no clamp distortion occurs.

For further detail regarding a preferred embodiment apparatus in accordance with the present invention, reference is made to the detailed description which is provided below, taken in conjunction with the following illustrations.

DETAILED DESCRIPTION OF PREFERRED EMBODIMENTS

The present invention is applicable to any of a variety of body-mounted camera stabilizing supports, such as the Steadicam® apparatus manufactured by Cinema Products Corporation, of Los Angeles, Calif. This latter device generally includes rigidly interconnected camera equipment (i.e., the camera and its associated lens(es), magazines, lens-control apparatus, recorders, etc.) located at the top of a central post, and other equipment such as the battery, video monitor and accessories located at the other end and supported on what is commonly referred to as the lower "sled". The unit is supported by a three-axis gimbal capable of being adjustably positioned at the point along the post that is approximately coincident with the center of gravity of the overall camera equipment support. In operation, the camera equipment is frequently panned, and it is desirable that the equipment be in dynamic balance such that it will spin without precession around the axis coaxial with the post.

To be noted is that the term "camera" is intended to mean any imaging device which can be directed in a specific fashion to capture an image, or sequence of images. However, it is to be understood that the term "camera" is not intended to restrict the types of gimbaled and suspended devices other than cameras (i.e., equipment) which may be adjusted in balance while in use in accordance with the present invention. The term "wireless" is intended to refer to any appropriate means for controlling a remotely positioned instrumentality over a distance without employing wires, including means such as radio, infrared, inductive loop, or other technology to be developed that fulfills this requirement. The term "joystick" is intended to refer to a (dual axis) rocker switch, for controlling one or more functions. This may include the use of a joystick or a plurality of spaced switches or buttons employed for similar purposes.

The present invention is directed to means for moving masses in complementary directions so that the static and dynamic balance of the camera equipment support is adjusted and/or maintained. The masses moved in accordance with the present invention may either be weights, or any of the various components that are associated with the camera stabilizing support (hereinafter referred to as camera equipment). This may include, but is not limited to movements of the monitor, battery, camera, video recorders, film magazines, etc.

Figure 1:
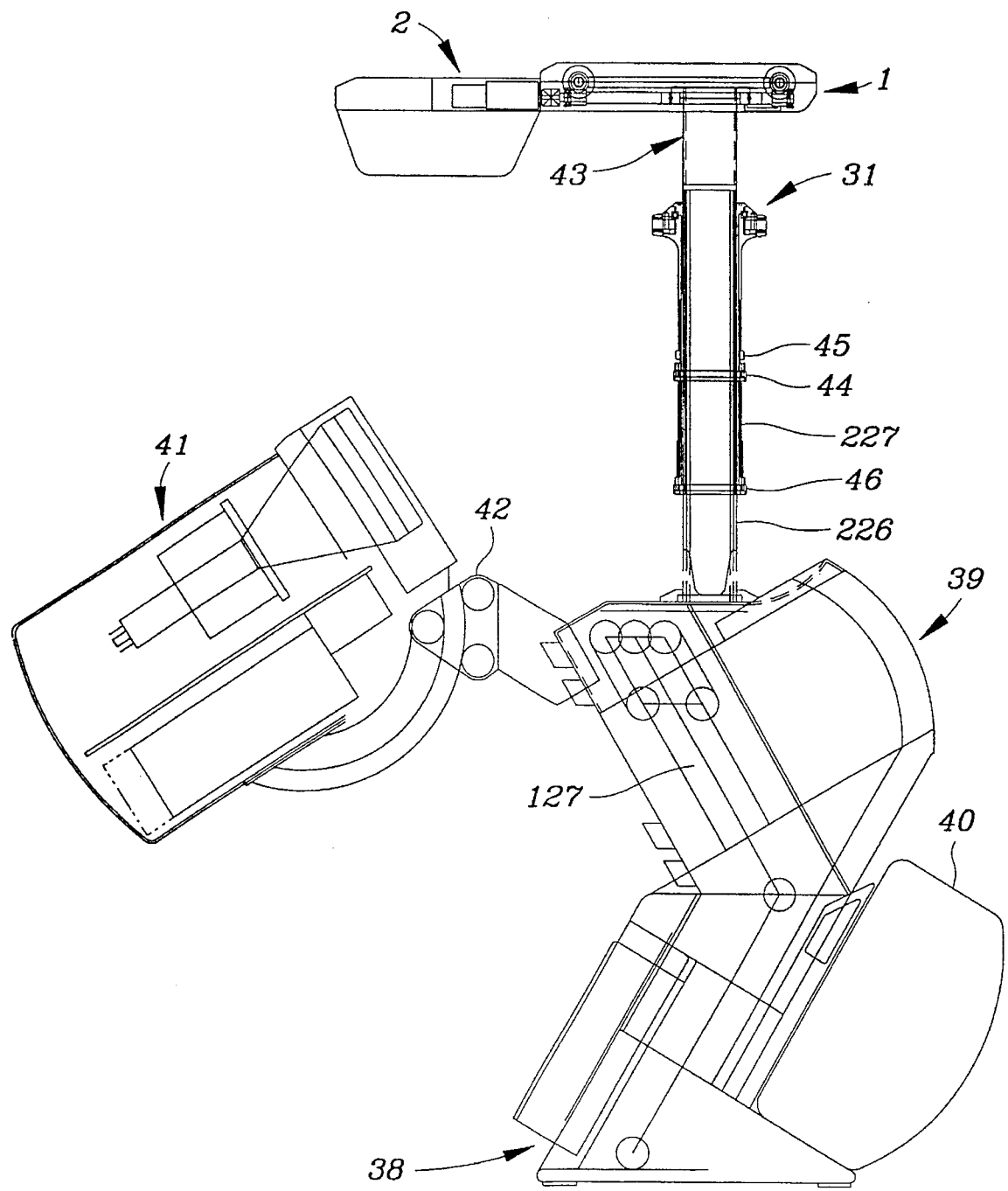
FIG. 1 shows a side elevational view of a preferred embodiment camera stabilizing support produced in accordance with the present invention.

FIG. 1 shows a preferred embodiment camera equipment support assembly 38 of the present invention, illustrating its various component assemblies. The stage assembly 1, with its removable motor module 2, is located atop the center post assembly 43 which connects the stage with the sled assembly 39. A gimbal assembly 31 is positioned on the outer post 46, with coarse lock assembly 44 and fine lock assembly 45. Inner telescoping post 226 is locked in the desired position by telescoping post lock assembly 46. Monitor 41 is held at a desired angle of tilt by a monitor support 42. The vertical position of the monitor is adjusted by a transport mechanism 127. In accordance with the present invention, dynamic balance is automatically maintained by repositioning battery 40 in a predetermined, coordinated manner.

Figure 2:
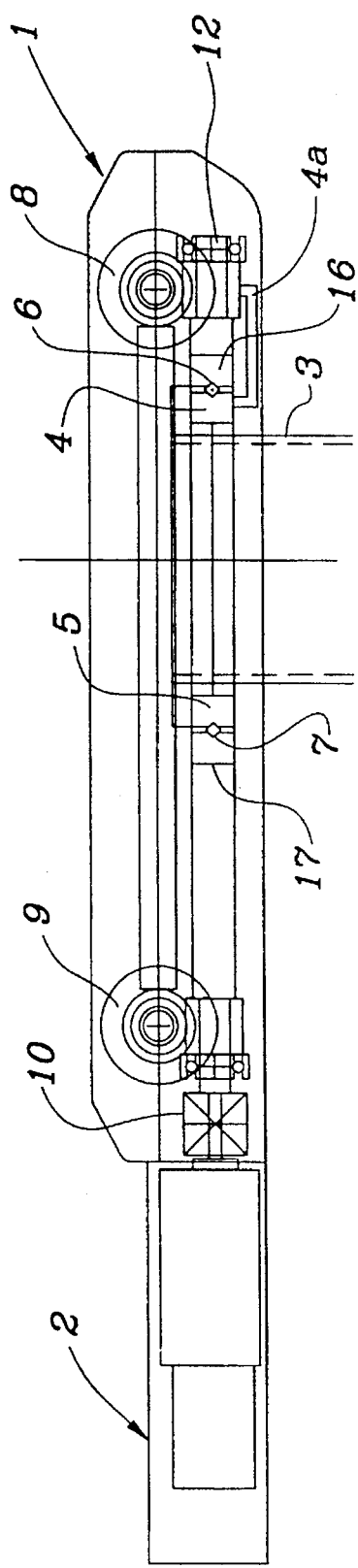
FIG. 2 shows a side view of the stage of the camera stabilizing support of FIG. 1.
Figure 3:
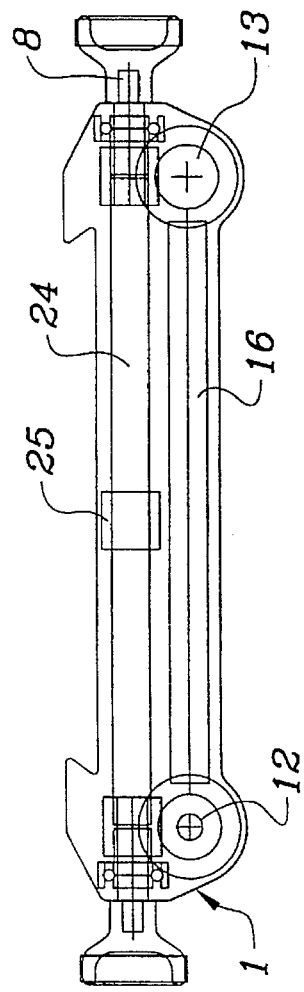
FIG. 3 shows an end view of the stage of FIG. 2.
Figure 4:
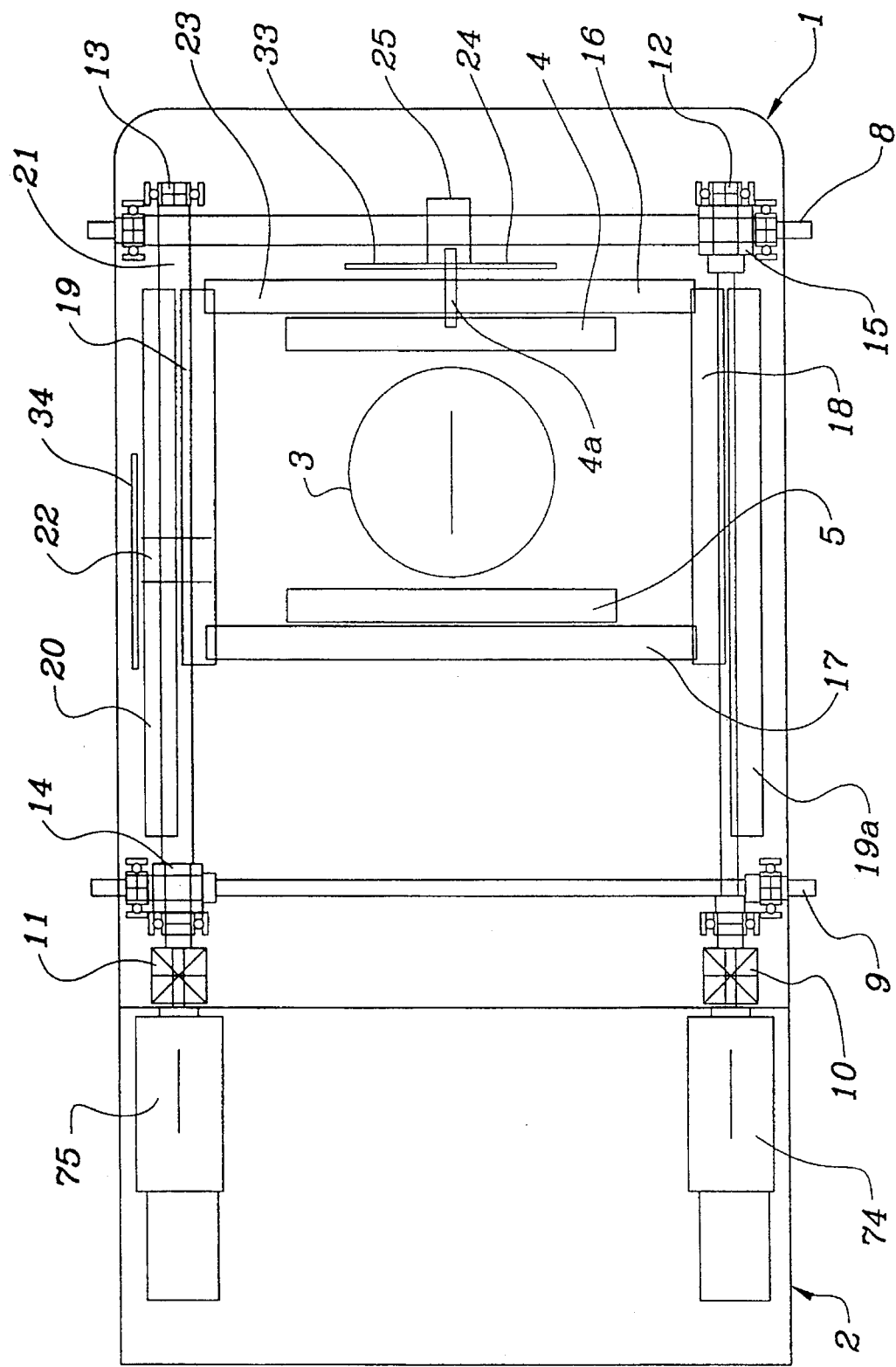
FIG. 4 shows a bottom plan view of the stage of FIG. 2.

FIGS. 2, 3 and 4 collectively illustrate a preferred stage assembly 1, which generally takes the form of a low profile "x-y" table. In accordance with the present invention, the x-y table of the stage assembly 1 permits control by a removable motor module 2, as well as manual control (from both sides of the table) by turning shafts 8, 9. The motors 74, 75 of the module 2 are connected by couplers 10, 11 to shafts 12, 13 which are respectively coupled to shafts 8, 9 by helical gear sets 15, 14. To permit this, the shafts 8, 9 cross above the shafts 12, 13.

The center post 3 of the support apparatus is attached to the x-axis assembly 23, indicated in its present location as it traverses the x-axis by means of the x-axis bearing blocks 4, 5, which capture flatted rods (not shown) which form races for the pre-loaded cross-roller bearings 6, 7. Outer x-axis bearing blocks 16, 17 are fixed to the stage structure, as are inner y-axis bearing blocks 18, 19. Shaft 13 comprises an acme screw 21 which drives a nut 22 which is attached to a bearing block 20. Bearing blocks 19a, 20 are attached to a conventional (dovetail) camera mounting plate (not shown) to move the camera's position along the y-axis relative to the stage. Shaft 8 comprises an acme screw 24 which drives a nut 25 which is fixed by a link 4a to an inner bearing block 4. The nut 25 therefore operates to move the x-axis position of the center post relative to the stage. Linear potentiometers 33, 34 are connected to and are positioned alongside the nuts 25, 22, respectively, and provide electrical signals for purposes of monitoring movements of the stage along the x-axis and y-axis, as will be discussed more fully below.

Figure 5:
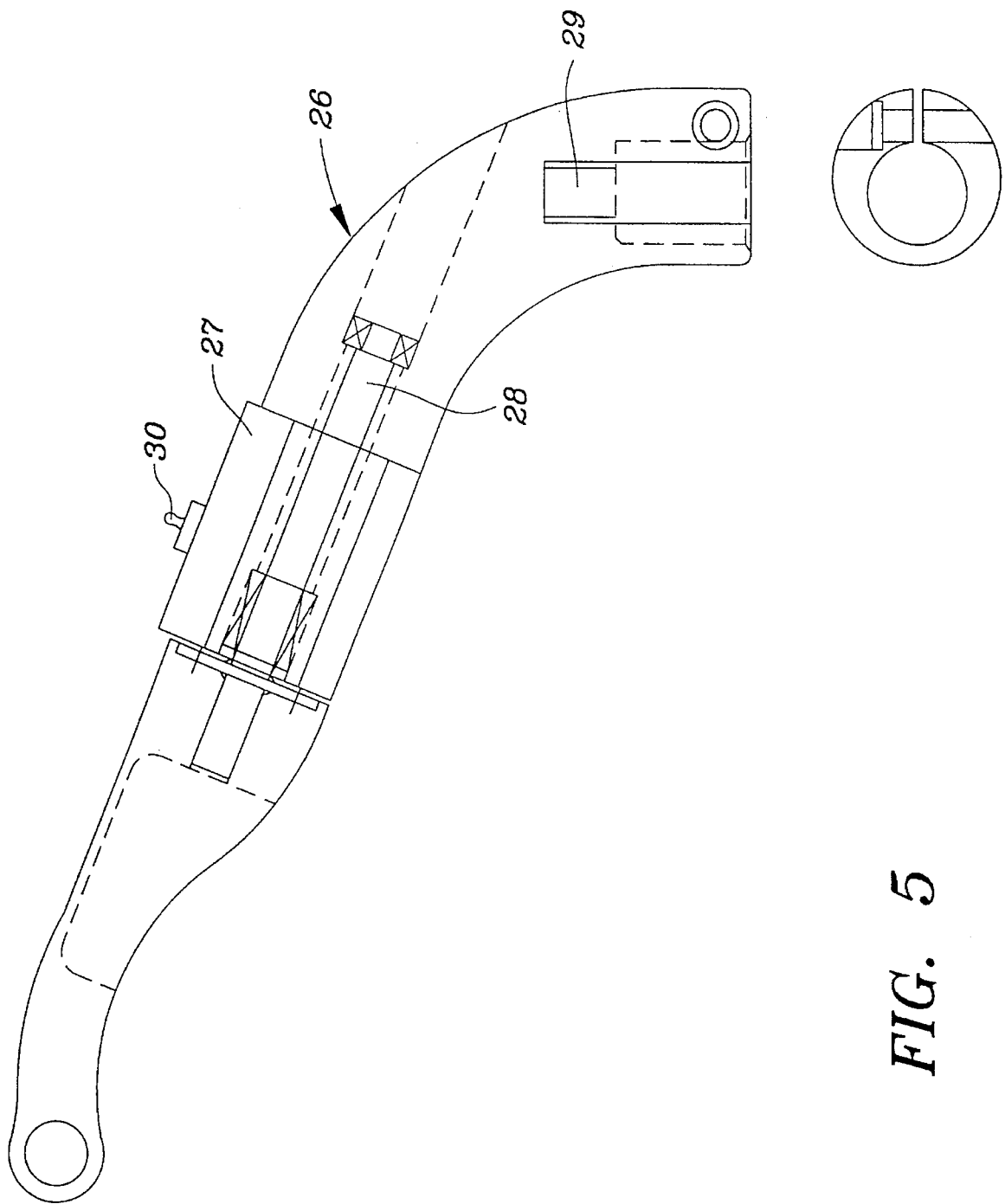
FIG. 5 shows a side elevational view of upper portions of a yoke handle for engaging the support apparatus of FIG. 1.
Figure 13:
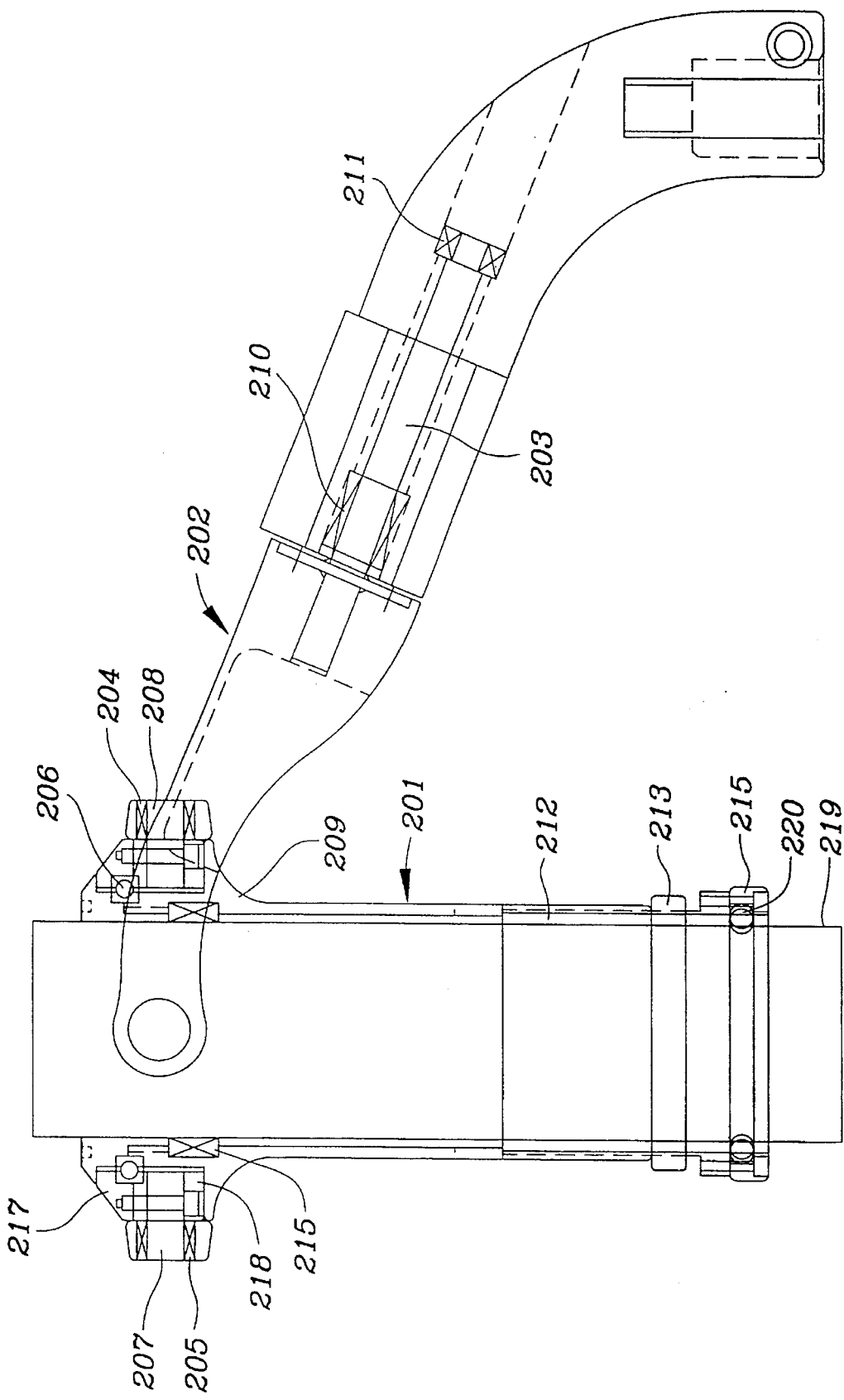
FIG. 13 is a side elevational view of the yoke handle, similar to FIG. 5, and further showing an associated gimbal mechanism with the yoke rotated 90°.

FIG. 5 shows the gimbal yoke handle assembly 26 of the apparatus, and includes a wireless transmitter 27 which is mounted above the pivot assembly 28. The wireless transmitter is powered by a battery 29. The transmitter 27 is controlled by a joystick control 30 so that the thumb of the operator's hand is free to function the joystick while holding and positioning the handle 26 (which connects the support arm, through a gimbal assembly 201, to the post of the camera equipment support 219, which are shown in FIG. 13).

Figure 5A:
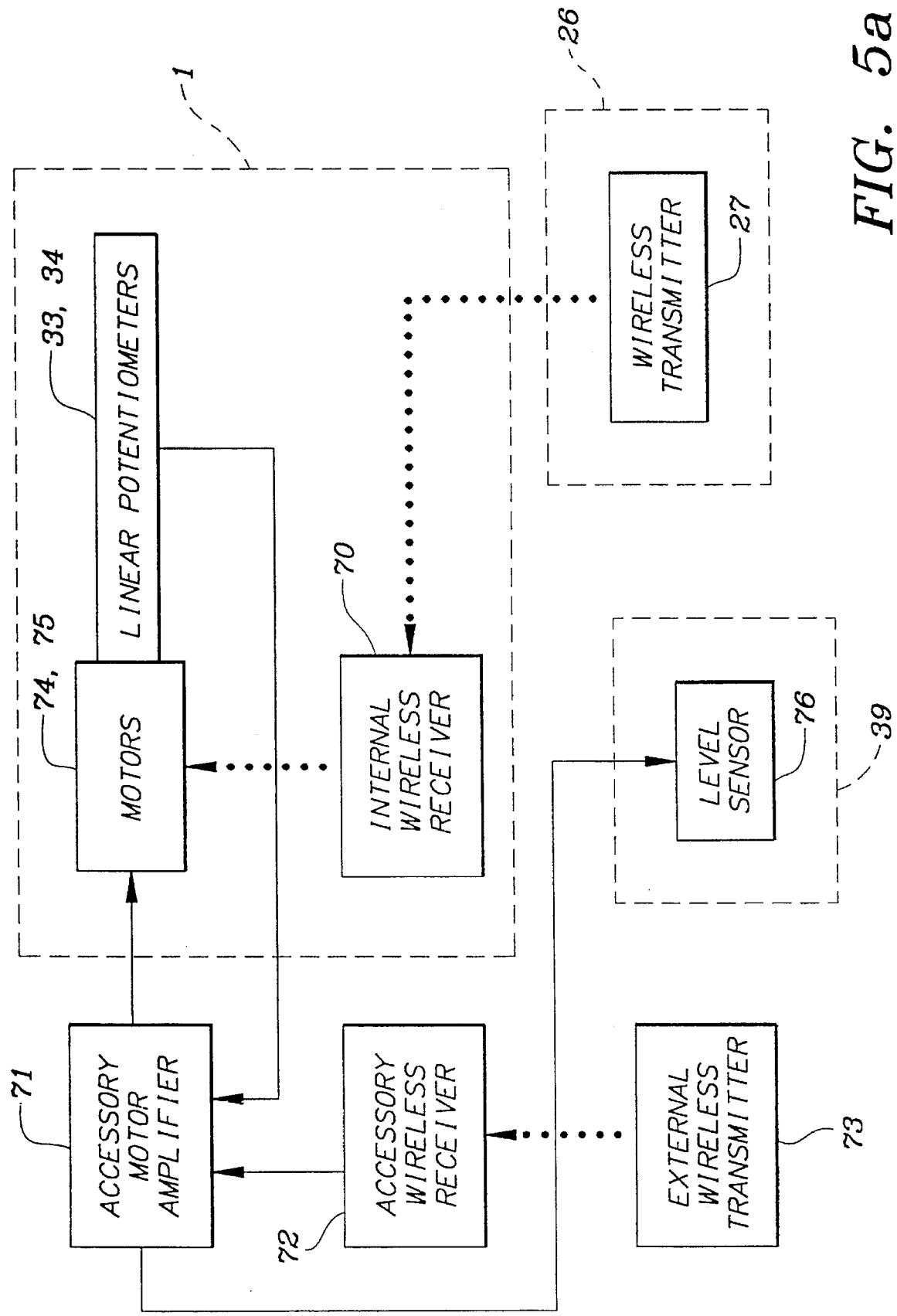
FIG. 5a is a block diagram showing interconnections of components for implementing the stage of FIGS. 3 to 5.

FIG. 5a is a block diagram showing interconnections of electronic components for implementing the stage of the preferred embodiment. To this end, the stage 1 includes linear potentiometers 33, 34 and motors 74, 75 associated with an internal wireless receiver 70. The internal receiver is adapted to function the motors when signaled by the transmitter 27 imbedded in the gimbal yoke handle 26. Alternatively, an external wireless transmitter 73 can communicate with an accessory wireless receiver 72, which controls accessory amplifier 71 and which in turn controls (servo controls) the motors 74, 75 in connection with the linear potentiometers 33, 34. A level sensor 76 provided in the lower sled 39 is also adaptable to control a channel of the amplifier 71, in order to control (servo control) the motors (in conjunction with their associated linear potentiometer) to automatically bias the gimbaled camera equipment back toward level.

The foregoing provides for remote-controlled adjustment of the motors, to move the position of the camera (and/or other camera equipment components) in a horizontal plane in order to "trim" the nominally upright attitude of the balanced gimbaled mass. The controls for this are preferably wireless, and are positioned on the operator's side of the gimbal so as not to impart any outside force which could alter the desired camera attitude. Such controls offer alternate methods for functioning the motors of the x-y table. Preferably, the trim may be adjusted as above described, either by the operator according to his present requirements, or by an assistant, using a separate, otherwise conventional wireless control device (e.g., following a preconceived, directed sequence). Alternatively, such adjustment may be accomplished by automatic (servo type) response to the output of an electronic level sensor on the camera equipment (e.g., to momentarily bias the balance of the camera equipment to return to vertical in the event of an error by the operator).

The upper stage is preferably implemented as a low-profile arrangement including an x-y translation stage modified to incorporate linear bearings, preferably of the cross-roller type, having races formed of flatted rounds. The races are preloaded to yield a precision structure with essentially no unwanted motion. The stage is moved along its x-axis and y-axis by motors acting through screw-drive mechanisms. The motors are advantageously controlled by a wireless control system in response to switches located on the handle of the gimbal, on the operator's side of the gimbal bearings, or on a remotely stationed unit.

The motors are preferably of the linear, hollow lead-screw actuating type, adapted to rotate the lead screws that drive the x-y translations of the upper stage of the camera support. This operates to displace the camera in the distinct directions that will influence, respectively, the "tilt" angle and the "roll" angle of the gimbaled camera equipment. The motor module is preferably removable, for servicing, and includes the receiver and circuitry necessary to reversibly function each of the motors (responsive to the command of the primary control system in use).

Preferably, the primary control system is a miniature, wireless, 8-channel radio-frequency transmitter of conventional design. The transmitter can either be embedded in the top of the hand-grip that surrounds the shaft of the exterior gimbal yoke (which is attached to the outermost end of the segmented exoskeletal arm of the camera equipment support), or is remotely stationed (for operation by an assistant). The operator is thus able to strongly function the grip (which is used for moving and positioning the gimbaled mass in space), as well as delicately and precisely adjust camera trim in two axes (e.g., by thumb contact with a miniature rocker-switch or joystick). In the preferred embodiment, this adjustment can be performed by directly functioning the motors, rather than through servo-controlled adjustment.

A secondary control system is provided and employs the linear potentiometers of the upper stage. The potentiometers should exhibit appropriate travel, to function over the full excursion of the lead screws for the respective x-axis and y-axis. The potentiometers are advantageously adapted for connection to either a conventional wireless remote control receiver/amplifier, or to a servo-amplifier which is driven by a voltage output representing the output of an electronic level sensing device adapted to indicate error on either side of "level" (up to roughly 4°, in the "roll" axis of the camera) It has been found that the average shot must be maintained by the operator within one or two degrees of level in order not to be objectionable when on screen. Shots that include strong vertical images in the background need to be kept within one degree of level.

The preferred embodiment stage also includes manual control knobs, for adjustment purposes. A dovetail mounting plate is provided for receiving the camera in a position roughly centered around the camera's center of balance. The plate is notched to be locked to the corresponding dovetail mount on the stage in a position that is roughly in fore-aft balance. The excursions of the lead screws on the x-y stage provide sufficient range to accommodate both fore-and-aft and side-to-side balance. As is conventional, the camera equipment is further arranged to place the center of rotation of the various rings of the gimbal roughly one-quarter of an inch above the actual center of balance of the camera equipment, to provide the slight bottom-heaviness that is customary.

The operator is therefore able to make trimming adjustments in both the tilt and roll axes without actually touching the gimbaled mass of the camera equipment. With the camera equipment floating on the support arm, appropriate functioning of the control system on the gimbal yoke (or remotely) serves to move the camera from side to side, to the position that permits level suspension of the camera. The operator likewise regulates movements of the camera fore and aft, until level suspension of the camera is obtained in that axis, as well. The control system is also advantageously (and more commonly) used to accommodate whatever deviation from fore and aft is appropriate for the beginning of the shot. With the present invention, different sections of a complex shot that require different fore-aft trim settings can be accommodated "on-the-fly", by adjustments of the x-y table using the control system (the rocker switch or joystick).

As previously described, the external servo amplifier for the fore-aft trim is connected to a linear potentiometer (e.g., up to 10kΩ) associated with the lead screw, and to the output of an additional wireless receiver (e.g., associated with the transmitter typically used to control the focusing of the lens by an assistant). The assistant is in such case additionally able to control the excursion of the fore-aft lead screw in order to make pre-planned trim changes during a shot.

The motor controlling the lead screw for adjusting side-to-side movements of the stage may, if desired, be connected to the output of an electronic level-sensing device which, once calibrated to level balance, will operate to displace the camera's mass from side to side (in the direction which is "uphill" ) if the camera should come to be off-level in the roll axis. This displacement causes a slight bias for the camera equipment to swing back to level, which can be detected by the operator's hand on the post.

In this way, operations of the camera equipment support in neutral balance are now possible which can substantially eliminate the compromises associated with bottom-heaviness, such as the need for slight corrections when accelerating or decelerating the camera. Nevertheless, the illusion of bottom-heaviness is provided, in the roll axis only, by the automated tendency to return to an upright position in the event of a slight derivation (error) in level. Automatic displacement of the camera's mass permits the camera to be re-balanced so that the exact center of gravity of the camera equipment is maintained to coincide with the common centers of the gimbal bearing (i.e., a neutral balance). Automatic displacement from side to side provides the feedback formerly supplied by bottom-heaviness, to help the operator maintain level.

The result is that for the first time, the operator can cause the camera to tilt up to any angle, and upon exerting the appropriate counter pressure, to bring the tilt to a stop. The camera will maintain that tilt angle with no further effort. Simultaneously, the roll angle can be biased to level by automatic shifting of the camera's mass (on top of the camera equipment support).

In addition to establishing an appropriate balance of the upper stage, and further in accordance with the present invention, the camera equipment support is provided with means for maintaining an appropriate dynamic balance of the lower sled portions of the apparatus, as well. To this end, and as previously indicated, this is accomplished through coordinated movements of lower sled components (including any of the masses traditionally deployed on the lower sled).

However, in a preferred embodiment, the onboard video monitor (the operator's means for viewfinding) and the onboard battery are the masses selected for coordinated translational movement. The reason for this is that, at times, the monitor is subject to the need to be raised and lowered to provide the best viewing angle, making it the component which most frequently precipitates the need for re-balancing.

The monitor is typically mounted forward of the central post, and the battery is typically mounted to the rear, in a balancing position. The monitor is preferably adapted for movement from its lowest viewable position to its highest position (which is typically a movement of up four inches). To this end, the monitor is allowed to move up, and slightly forward (toward the camera's subject), by an inclined track which causes the monitor to progress along a predetermined (plotted) path. At the same time, the battery is caused to move synchronously downward and forward, on a second track coordinated (plotted) with the first track. Both paths (tracks) are co-planar with the axis of the central post. Throughout such repositioning, vertical balance and dynamic balance of the camera equipment is maintained. Essentially, all that is then required is to restore fore-aft static balance, by a slight rearward shift of the camera's mass above the gimbal (which is made possible by the above-described x-y table arrangement).

Figure 6:
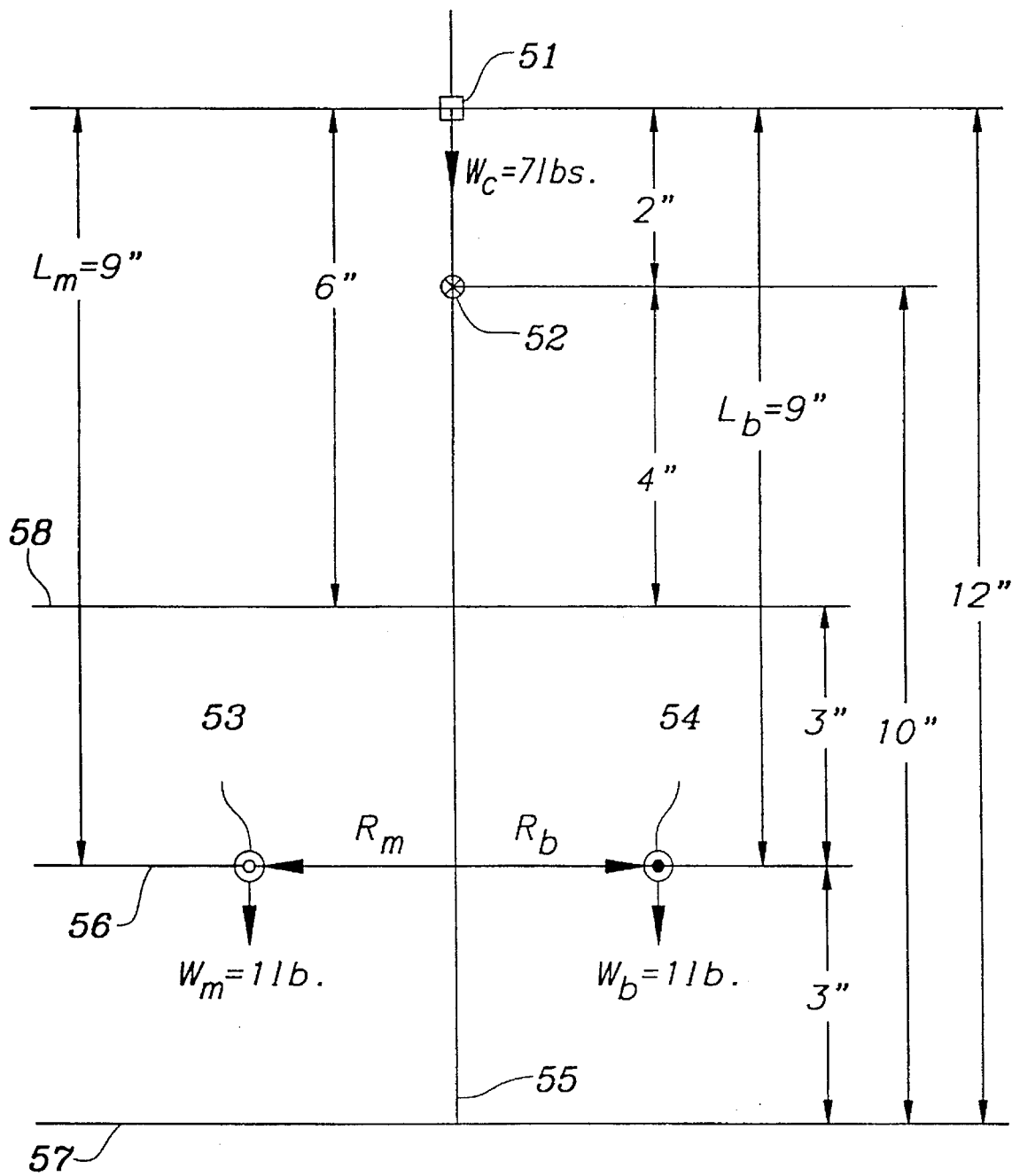
FIG. 6 is a schematic illustration of a static symmetrical relationship between two lower masses counterbalancing an upper mass, in dynamic and static balance.

The foregoing is illustrated with reference to FIG. 6, which schematically demonstrates an arrangement for operating on three masses 51, 53, 54, to maintain them in dynamic balance. The heaviest mass 51 (at the top) represents the camera (having a weight of, for example, seven pounds), which is centered on the post 55. Other components 53, 54 (each having a weight of, for example, one pound) are also adapted for movement, and are symmetrically disposed on either side of, and along the center line 56 of their potential vertical displacement (the extremities of which are defined by lines 57 and 58). Gimbal 52 is located at the center of gravity of the overall system. The distances Rm and Rb are arbitrary, but identical. This system is in both static and dynamic balance.

The relevant formulas for computing dynamic and static balance for such a system are discussed below. In this discussion, "W" is the weight, in pounds; "R" is the radius from the center post (which is the desired axis of rotation), in inches; "L" is the distance from the reaction point (the chosen point around which the rotative force is to be applied), in inches; "b" refers to the battery; "m" refers to the monitor; and "c" refers to the camera.

For the case of three masses, in static balance:

$$Wm \times Rm = (Wc \times Rc) + (Wb \times Rb) \qquad (1)$$

In this equation, the items to the left (the resultant) are found to the left of the post. The items to the right (the addition) are mounted to the right of the post.

For two masses in dynamic balance around a reaction point which is in line with the center of mass of a third mass:

$$Wb \times Rb \times Lb = Wm \times Rm \times Lm \qquad (2)$$

In this equation, the item(s) which exert a counterclockwise force on the post are to the left, and the item(s) which would exert a clockwise force are to the right.

To determine an unknown Rb:

$$Rb = (Wm \times Lm \times Rm)/(Wb \times Lb) \qquad (3)$$

To then determine the value of Rc (when the system is in dynamic and static balance):

$$Rc = ((Wm \times Rm) - (Wb \times Rb))/Wc \qquad (4)$$

To calculate the angular path of a given component (such as the battery) from its highest to lowest contemplated position, the R values for both positions (high and low) are calculated using the desired values for L (using Formula 2). The deviation of the resultant angle from the vertical (in degrees) is derived by the formula:

$$\operatorname{Tan}^{-1}(R_H - R_L)/(L_L - L_H) \qquad (5)$$

To finally check the dynamic and static balance positions for the three masses, with the reaction point lowered (e.g. to the gimbal position), the following equation applies (note that the L values will have changed):

$$(Wm \times Rm \times Lm) + (Wc \times Rc \times Lc) = (Wb \times Rb \times Lb) \qquad (6)$$

In this equation, the counter-clockwise centrifugal forces are to the left (the addition), and the clockwise centrifugal forces are to the right (the resultant).

The adjustments of the present invention proceed according to the foregoing equations, and assumes that the net moment of any and all additional equipment components and structural members is zero with reference to the axis of the central post. It is suggested that a detailed analysis of the center of gravity relative to the individual positions of all "non-moving" equipment may be computed in accordance with these equations, and that the post location should be selected to be on the line of dynamic balance. For calculating the net effect of components with moments remaining outside of this line, reference is made to FIG. 9, and Formulas 8 and 12 below. In the alternative, the dynamic balance of the non-moving components can be determined empirically, by adjusting the position of the center post until the system (without the components which are to move) spins with no precession. Reference is made to the articles co-filed with this patent application, for additional information on this technique and on the general mathematical considerations of dynamic balance for suspended camera systems.

It should be noted that Formulas 2–4 presume a reaction point at the center of mass of the camera, which will be mounted on the top of the post. The rotational moment of the camera is therefore zero, and its weight and lateral position can be disregarded. The foregoing requires a selection of the values Wm, Lm, Rm, Wb and Lb, which include the weights of the components which will move, and the location of the controlling component (in this case, the monitor) at a selected point along its desired path of travel. Once Rb is determined, showing the required complementary location of, for example, the battery (on the other side of the center post) for dynamic balance, then Rc (the lateral displacement of the camera required to re-establish static and dynamic balance of the entire system) can be computed using Formula 4. A check of the static and dynamic balance for known values is made with Formulas 1 and 2. Formula 6 confirms dynamic balance with the reaction point lowered (e.g., to the gimbal location for static balance), and is computed with the resultant change in L for the three salient masses.

An alternate method for determining the potential dynamic movements of two complementary components can be achieved empirically, by measuring the performance of a spinning test-fixture comprising components of representative weights, with adjustable locations, suspended at its center of gravity by a 3-axis gimbal. The fixture must be spun rapidly enough to test for precession. The components can be moved by trial and error to establish a series of complementary positions, each of which permits the fixture to spin without precession.

Figure 7:
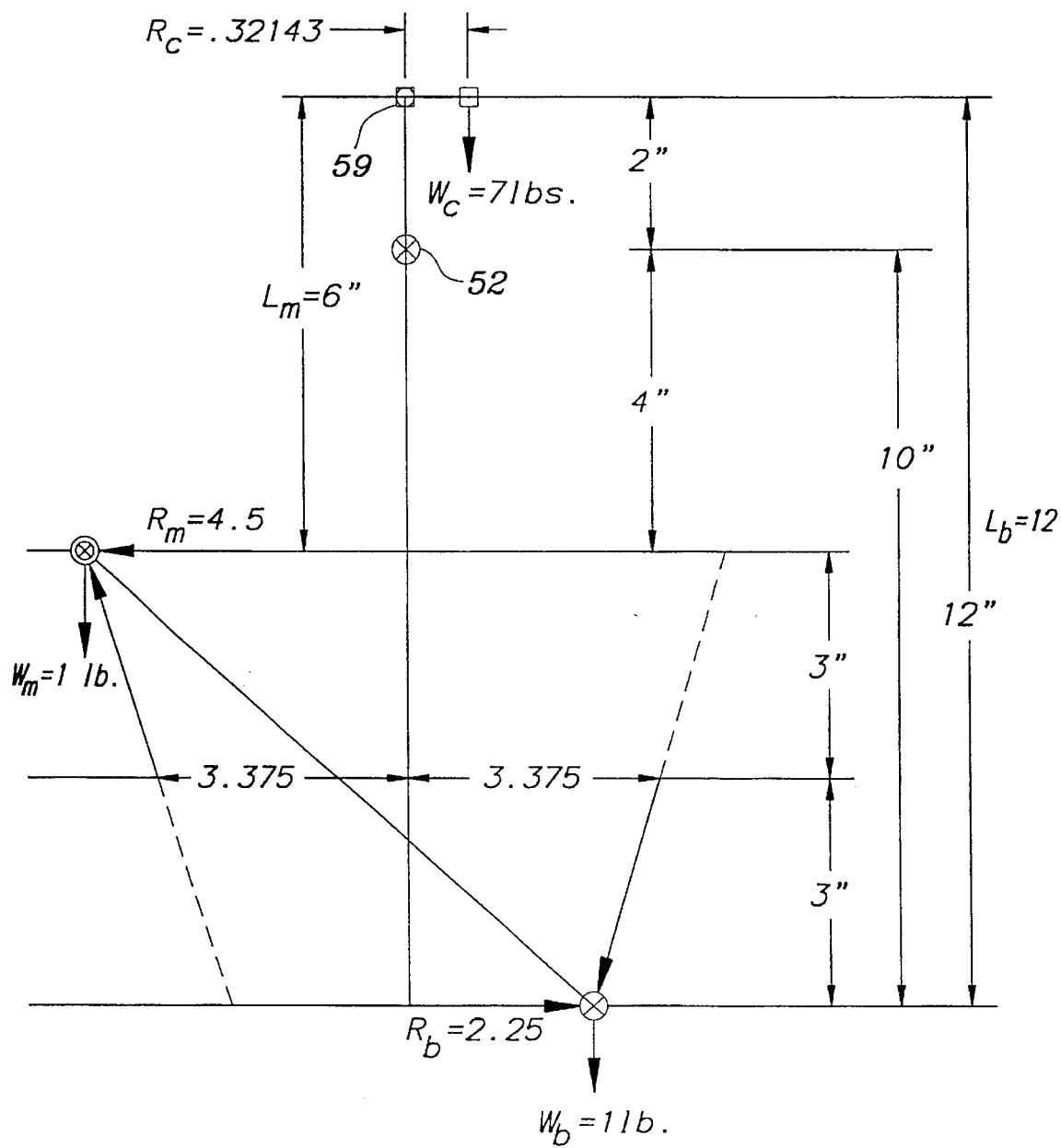
FIGS. 7 and 7a are schematic illustrations similar to FIG. 6, showing symmetrical, dynamically-constant movements of the masses.

FIG. 7 shows the same masses, with the "monitor" on the left, raised up and moved forward to a desired viewing location. The "battery" (on the right) has been lowered, in accordance with the present invention, to the location required to preserve dynamic balance. Since these weights are of equal mass, this defines a symmetrical pair of opposing vectors which would keep the synchronously moving masses in dynamic balance throughout their travel. The values shown for Rb and Rc were computed using Formulas 2 and 3. Reference number 59 shows a reaction point chosen for use with Formula 3. A sample reaction point for use with Formula 6 might be the gimbal position 52.

Figure 7A:
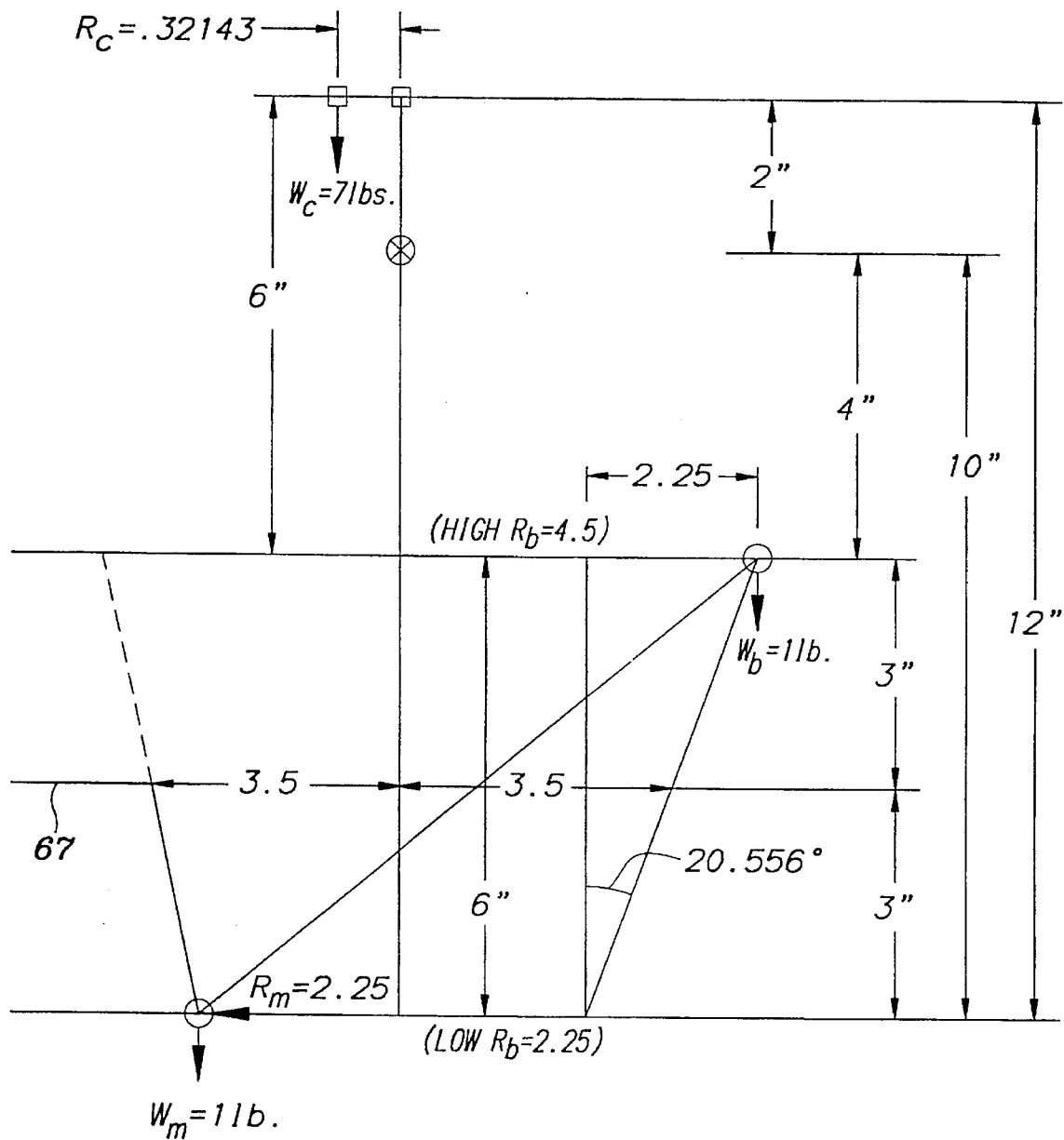

FIG. 7a illustrates the opposite extremes of travel of the masses shown in FIG. 7. Also shown is a right triangle defined by the differences between Rb at the top of travel and Rb at the bottom of travel (see FIG. 7). The resulting angle of the battery's path can be computed using Formula 5. Note the opposite displacement, forward of the camera, required (in FIG. 7) for static and dynamic balance. Note that in all cases illustrated here, the lateral position of the camera must change as the masses (below) travel through their range of excursion. In practical terms, once the monitor has been raised, for example, it is easy for the operator to then adjust the camera to the rear until the gimbaled camera equipment is re-balanced (to upright). At this point, by definition, the camera equipment is in both static and dynamic balance (the calculated displacement in this case is 0.3318 inch). As a practical matter, this arrangement (low monitor, high battery) would seldom, if ever, be invoked. However, its definition is useful to establish the angle of travel for a given component. Note that the length Rb, at the midpoint of travel, can also be computed when the monitor and the battery are opposed (on the center line 67). Such calculations will proceed according to the equation:

$$Rb(mid)=Rb(high)-0.5\times(Rb(high)-Rb(low)) \quad (7)$$

Figure 8:
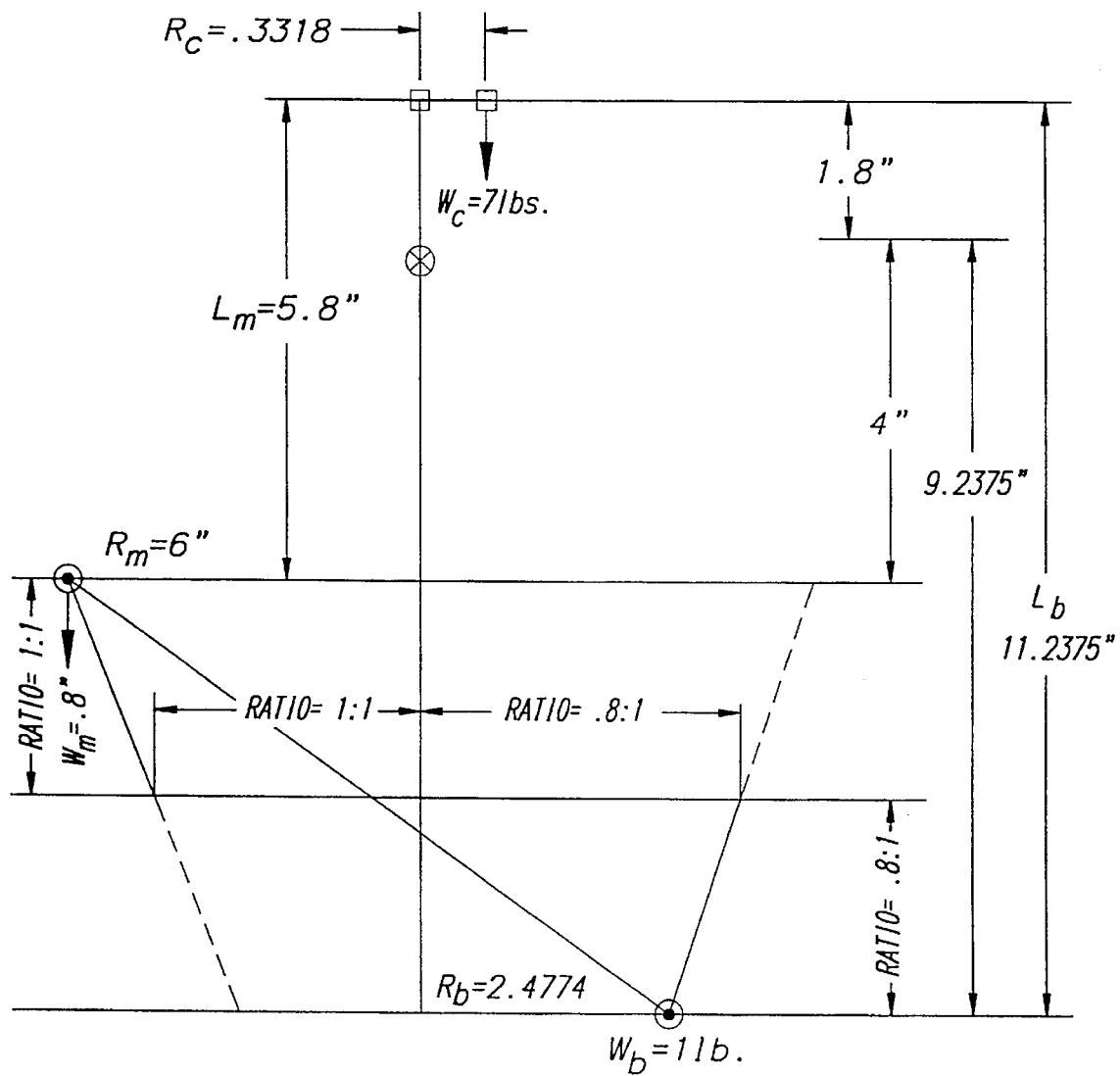
FIG. 8 is a schematic illustration similar to FIG. 6, showing proportional, non-symmetrical dynamic movement of the masses.

FIG. 8 shows the effect on the foregoing when the masses to be moved are of unequal weights. The monitor in this illustration weighs 0.8 pounds, coordinated with the movement of a one pound battery. The components move in inverse ratio to their respective masses, both horizontally and vertically. Note that an arbitrary low position could be assigned for the monitor, and the opposing high position could be calculated for the battery. The angles of the opposing paths of travel could be quite different, as could the respective distances of travel.

Figure 9:
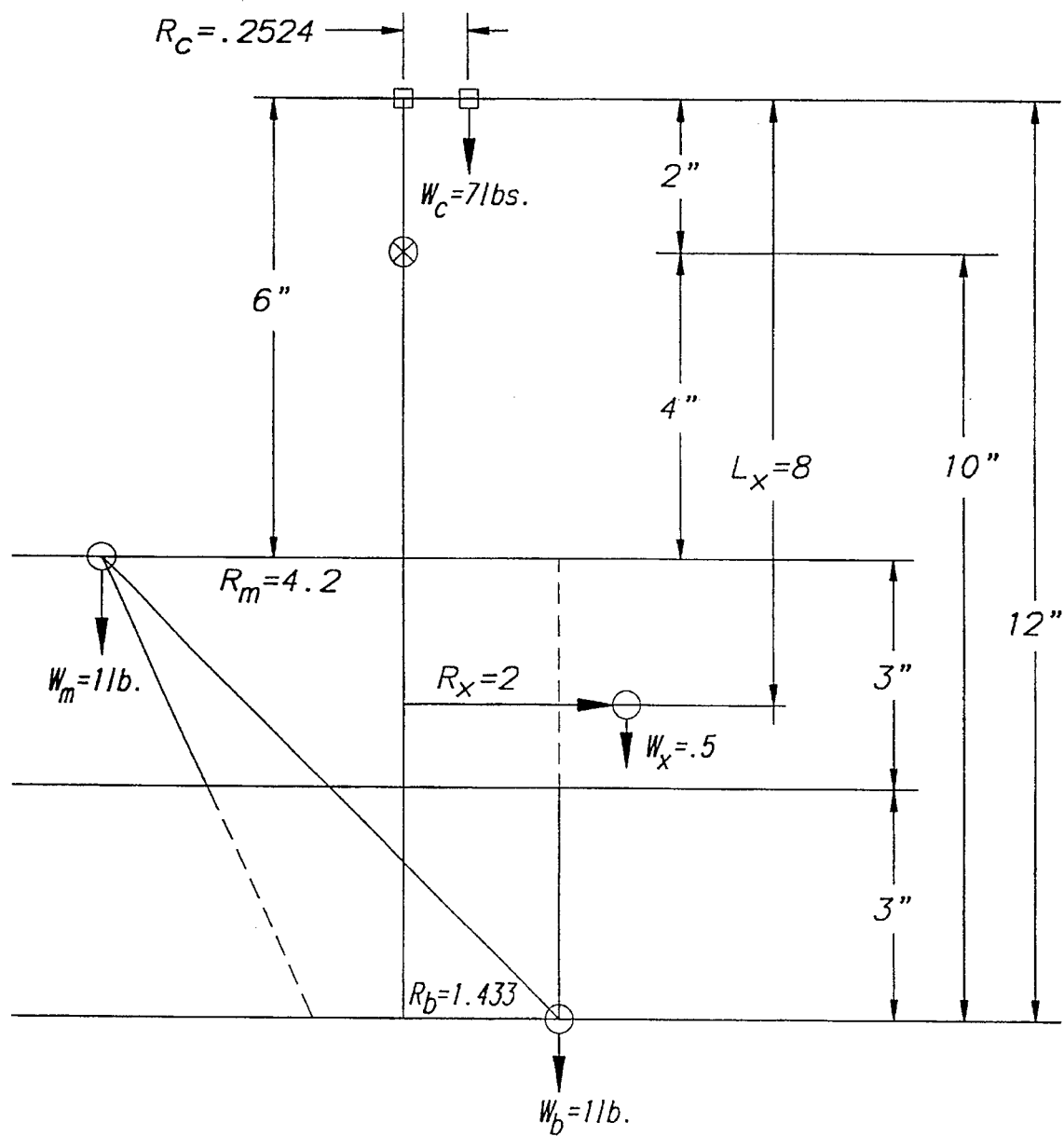
FIGS. 9 and 9a are schematic illustrations similar to FIG. 6, showing proportional, dynamic movements of components including an additional fixed mass spaced from the axis of rotation.
Figure 9A:
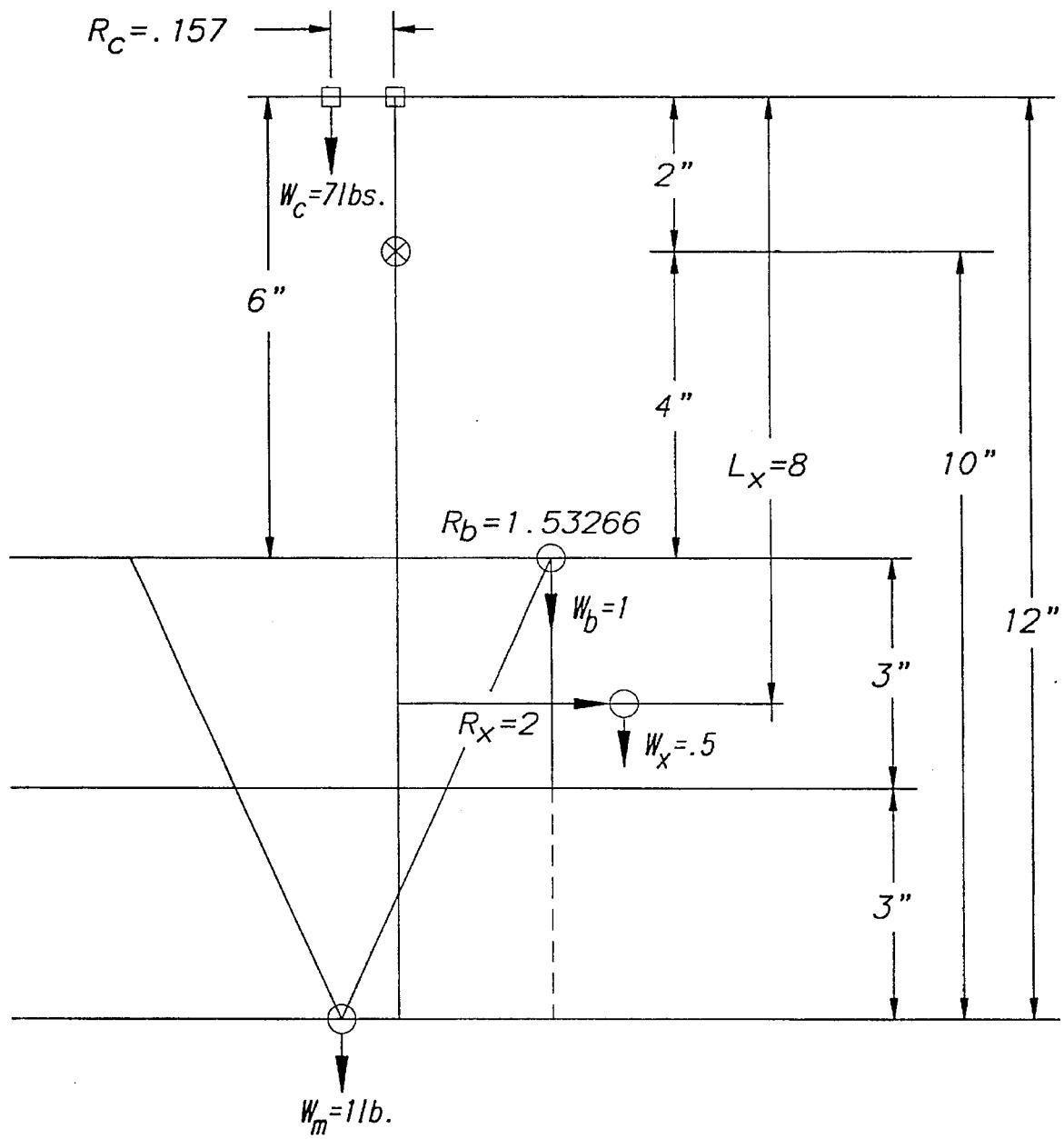

FIG. 9 shows the effect on the computed values for the high monitor/low battery position when a fixed weight x is introduced at the position shown. The resulting paths are no longer symmetrical. The modified equations used to account for the effect of an additional fixed mass are as follows.

For the static balance of four masses:

$$Wm\times Rm=(Wc\times Rc)+(Wb\times Rb)+(Wx\times Rx) \quad (8)$$

Note that the particular mass x, as shown in FIG. 9, is added to the right of the equation (to check for static balance in Formula 8) because of its position to the right of the post.

Dynamic balance of the three masses around the reaction point, disregarding the camera's mass, is as follows:

$$(Wb\times Rb\times Lb)+(Wx\times Rx\times Lx)=Wm\times Rm\times Lm \quad (9)$$

Mass x is shown to the left of the equation (for dynamic balance) because it would tend to exert a counter-clockwise centrifugal force when rotated.

To determine the radius (Rb) for the battery, with the additional fixed mass x:

$$Rb=((Wm\times Lm\times Rm)-(Wx\times Rx\times Lx))/(Wb\times Lb) \quad (10)$$

To then determine the resultant value for Rc:

$$Rc=((Wm\times Rm)-(Wb\times Rb)-(Wx\times Rx))/Wc \quad (11)$$

To finally check the dynamic balance with the reaction point lowered to the position of the gimbal (note that the L values will have changed):

$$(Wm\times Rm\times Lm)+(Wc\times Rc\times Lc)=(Wb\times Rb\times Lb)+(Wx\times Rx\times Lx) \quad (12)$$

Again, note that items exerting a counter-clockwise force are shown to the left of the equation and items exerting a clockwise force are shown to the right of the equation. The direction of these forces depends on whether the object represented is either above or below the gimbal and to the left or right of the post.

FIG. 9b shows the masses of FIG. 4, but with the monitor at its lowest excursion, compensated for by the battery at its highest travel. Again, a definition of these extremes of travel is helpful in determining the angles of travel for the respective components.

Thus, the resulting vertical and horizontal displacements of the masses are defined in accordance with the present invention, and synchronous motion of the system's components (in this case, the monitor and battery) are, in a preferred embodiment, accomplished with interconnected carriers that move automatically and on complementary tracks. The carriers are preferably linked for coordinated movement by cogged belts which interact through a simple transmission to move in inverse proportion to the relative weight of the respective masses (including, for example, the monitor and the mounting hardware that travels with it).

Further in accordance with the present invention, the structures that attach the masses to their respective carriers are preferably adapted for yet another degree of relative motion to accomplish a different objective; the adjustment of the total amount of rotational inertia of the system. In the preferred embodiment, the monitor and battery are both adapted to be moved forward and backward, respectively, so that each moves on a path perpendicular to and co-planar with the axis of the central post and parallel to the axis through the camera lens. Provided both masses are moved apart or together synchronously (and in inverse proportion to their relative masses), and additionally in direct proportion to their relative distances from the axis through the camera's lens, the increase or decrease in the resultant moment of rotational inertia in the pan axis will not be achieved at the cost of degrading the dynamic balance of the camera equipment. Since shots that may require additional inertia in the pan axis do not generally include the need for rapid panning, both masses may also be moved an equal distance apart. This preserves static balance, at the cost of a slight dynamic imbalance.

In sum, and in accordance with the present invention, the paths of masses selected for dynamic motion are regulated so that at any point in their coordinated travel, the camera equipment is in static and dynamic balance. Proportional movements are performed if the components are of a different mass, and the effect of additional fixed masses on such movements can also be taken into account. In all cases, steps must also be taken to reposition (by compensating motions) the balancing mass located above the gimbal (generally the camera). Also in accordance with the present invention, locations are provided for accessory mountings which are sufficiently close to the axis of the center post to have no perceptible effect on dynamic balance. The result is that for the first time, operators can rely on the dynamic and static balance of the camera equipment despite movements such as raising and lowering of the monitor.

Figure 10:
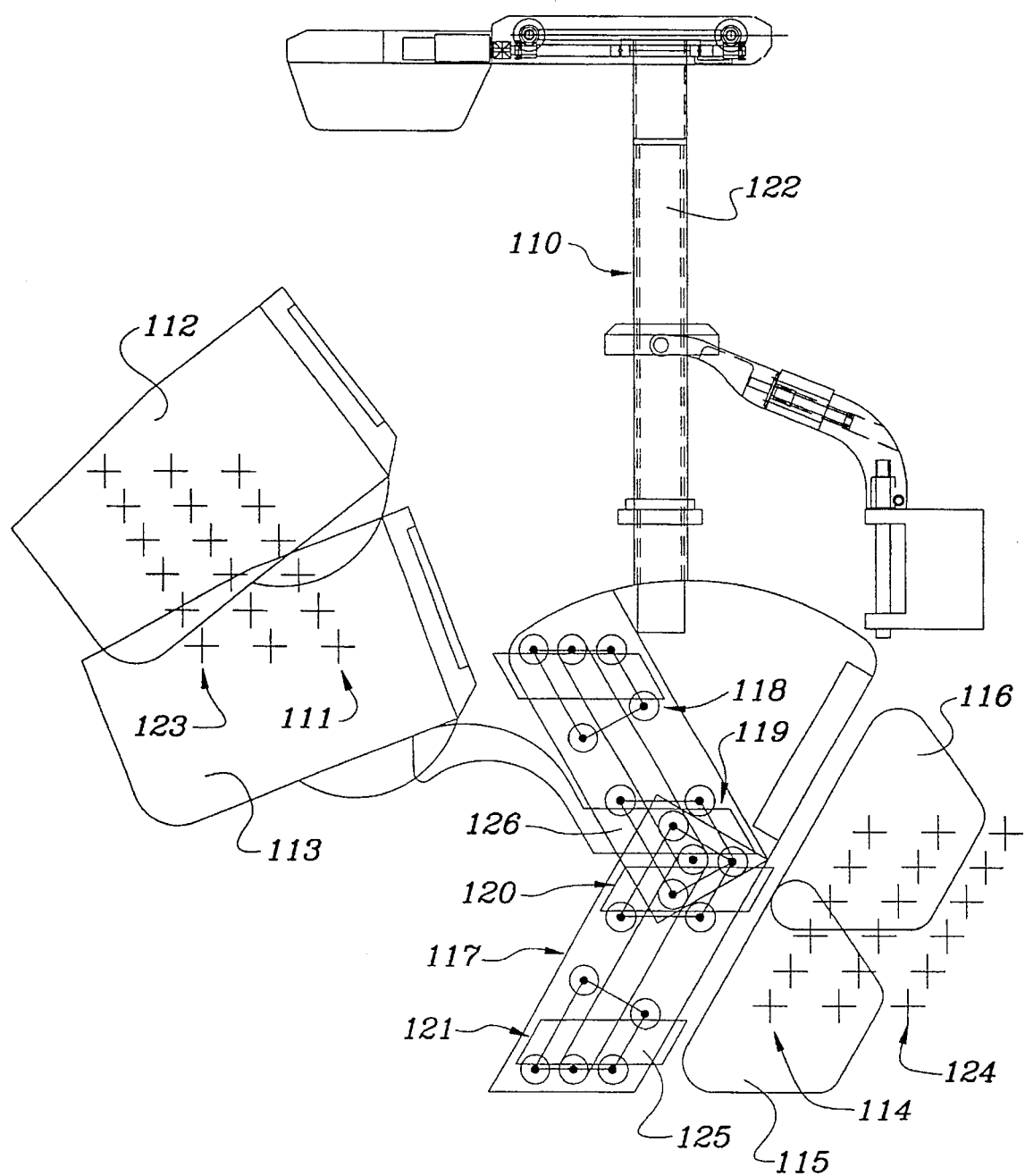
FIG. 10 is a side elevational view similar to FIG. 1, showing the equipment support (without a camera) and relative movements of two of its components.

FIG. 10 shows an embodiment of a camera equipment support 110 capable of achieving the foregoing adjustments and manipulations. Note the row of "x's" 111 describing the path of the center of gravity of the monitor 112 as it moves to its lowest position 113. Another row of "x's" 114 describes the path of the center of gravity of the battery 115 as it is automatically raised to the proper counterbalancing position 116, to maintain the equipment in static and dynamic balance (after the camera (not shown) above has been moved an appropriate distance forward).

Also shown is a transport mechanism 117 for moving the monitor and the battery, and the extreme top and bottom locations 118, 119, 120, 121, respectively, of the interconnected carriers that automatically transport the components to their desired positions (with the centers of gravity travelling along the paths shown). Note the location of the center post 122, about which the equipment support is preferably in dynamic balance. Rows of "x's" 123 and 124 illustrate the independent adjustment of monitor and battery positions to increase the rotational inertia of the system.

Extension posts 125, 126 are provided for mounting the battery and monitor, and to permit each to be appropriately moved away from the center post 122. If this adjustment were made with the monitor and battery in direct opposition at the midpoint of travel, no effect on dynamic balance would occur. Since this increase in inertia would not be desirable if rapid panning was contemplated, the effect on static balance would be negligible, and the effect on dynamic balance would be unobjectionable, even when the monitor and battery were at different levels. If desired for a particular application, linear cams can be used to limit the travel of the monitor and battery (by limiting travel of the extension posts) to values that are inversely proportional to their adjusted vertical distance from the axis of the camera's lens, thus preserving dynamic balance throughout the range of travel of the components.

Figure 11:
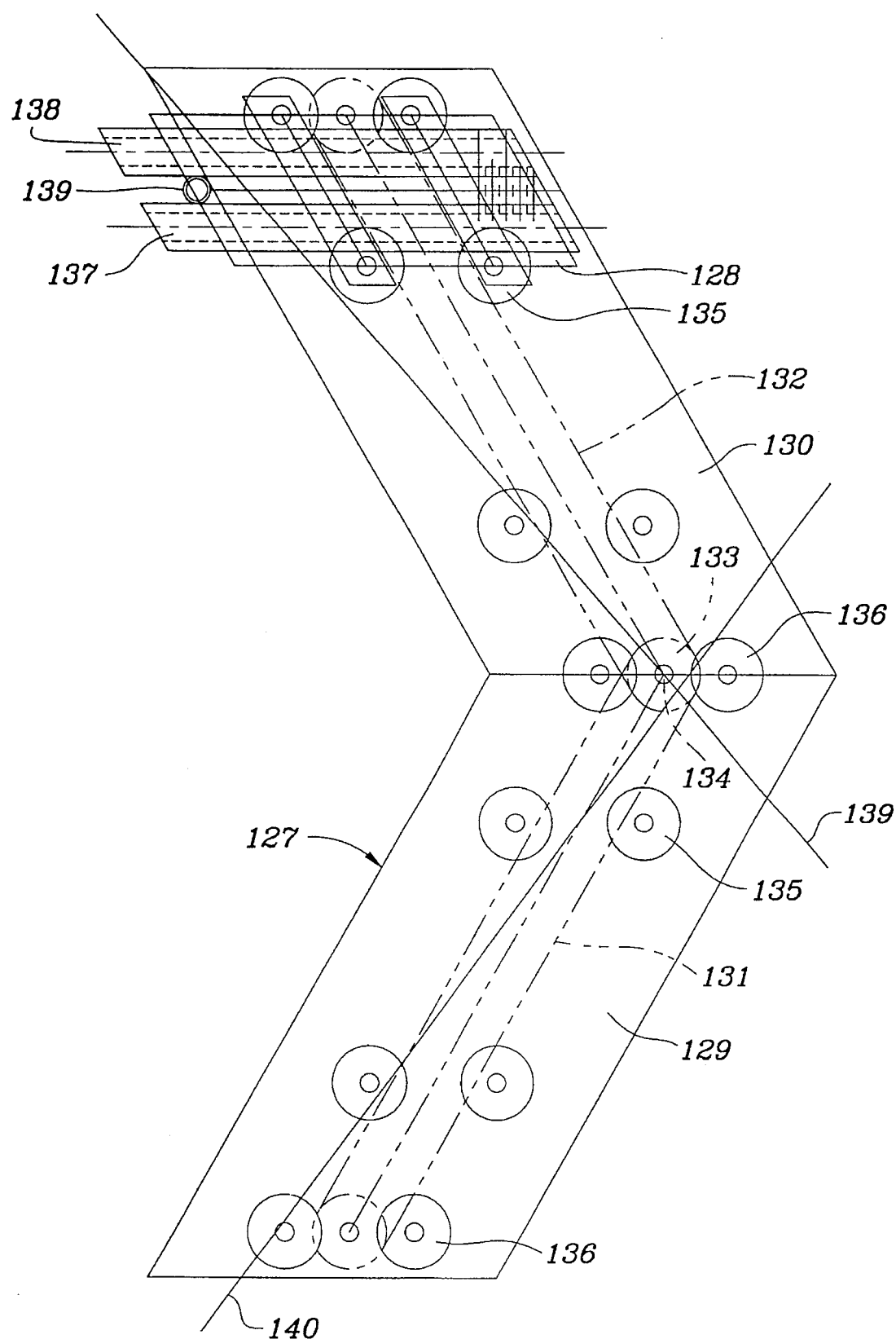
FIG. 11 is an enlarged, side elevational view of a dual-tracked carrier mechanism for proportional movement of the masses along the paths shown in FIG. 10.

FIG. 11 shows the transport mechanism 127 in greater detail. As shown, carriers 128 ride on pre-loaded rollers, preferably along tracks defined by extrusions 129, 130 that form the structural skeleton of the lower portion of the equipment support. Pre-loaded toothed belts 131, 132 interconnect the carriers for the monitor and battery, by means of coaxial sprockets 133 on a common shaft 134. If the components are of unequal weight, sprocket sizes can be selected to move the carriers in inverse proportion to the weights carried in order to preserve static and dynamic balance in the system, as previously described. The extrusions 129, 130 are positioned and joined at an angle so that the monitor and battery will move according to their appropriate paths, which are again determined as previously described. Roller positions shown at 135, 136 represent the upper and lower limits of travel of the sections supporting the extension posts 125, 126, respectively Extending posts 137, 138 are provided to receive mounting equipment associated with the monitor, and are slidably positioned within the corresponding carrier. Similar extending posts (not shown) are provided for mounting the battery. The extending posts 137, 138 are preloaded, and are retained in proper position by a pressure pin 139. Although not specifically illustrated, the extending posts 137, 138 could also be implemented as a single post, if desired. Linear cams (not shown) can, if desired, be deployed along lines such as the lines 139, 140 illustrated, to engage pins (not shown) on the respective extending posts and to restrict travel (in-or out) of the monitor and battery in order to automatically preserve dynamic balance throughout their range of motion.

Figure 12:
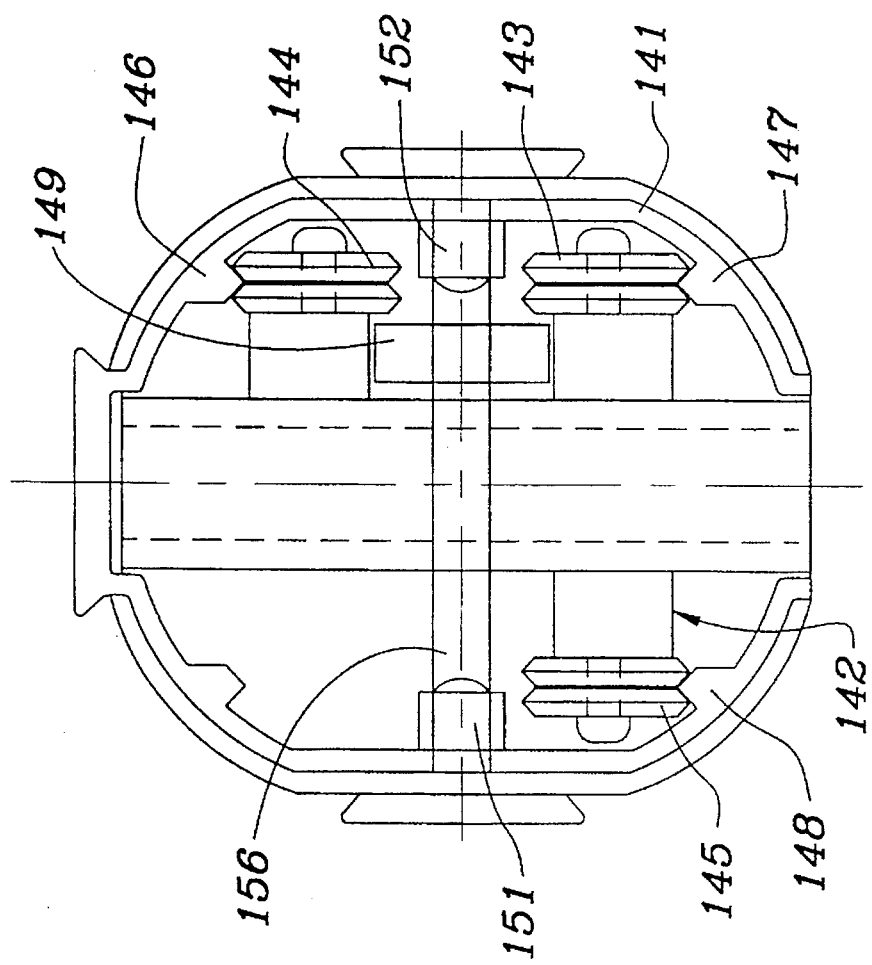
FIG. 12 is a end view of the carrier mechanism of FIG. 11.

FIG. 12 shows an end view of an extrusion 141, with a carrier 142 visible. Guide rollers 143, 144, 145 are shown engaging rails 146, 147, 148 within the extrusion. Belt sprocket 149 is fixed to shaft 156, turning within the bearings 151, 152. The toothed belt 131 (see FIG. 11) is fixed to the carrier 142, for synchronous transport along the rails.

Still further improvements are achieved in accordance with the present invention by providing a novel gimbal and extendable post configuration. As used herein, the term gimbal refers to the series of annular yoke rings, bearings, yokes and pivoting bearings that are assembled to achieve 3-axis angular isolation for camera stabilizing support devices of the type described herein.

To this end, FIG. 13 shows a preferred gimbal mechanism 201. The single pan bearing 206 provides the first degree of angular isolation, and is positioned above the common center of the yoke bearings to permit the trunnion pins 207, 208 to nest underneath. This allows the top curve of the pan handle 209 to be located virtually at the center of gravity of the camera equipment, which is typically about one-quarter inch below the axis defined between the gimbal yoke bearings 204, 205. The pan bearing 206 has an outer race which is captured by a cap 217 and carrier 218, with the trunnions extending outward to engage the yoke bearings. A "Delrin" guide 215 provides a close centering fit between the pan handle 209 and the center post 219. The gimbal yoke 202 (shown rotated 90° and superimposed for clarity) pivots on bearings 204, 205 to provide a second degree of angular isolation, and pivot pin 203 swivels on bearings 210, 211 to provide a third degree of isolation.

The horizontal axis bearings (i.e., the "yoke" pivot bearings) are located outside the yoke ring, permitting the yoke ring to be smaller in size. The gimbal further employs a single main bearing, rather than the two separate bearings previously used, and has its main bearing located above the axis of the yoke pivot. This enables the main bearing to nest within the yoke pivot bearings, further reducing the size of the gimbal. These features permit the operator to grasp the handle nearly at the center of gravity of the camera equipment, rather than well below the center of gravity, as encountered in prior devices.

In accordance with the present invention, the center post is formed as two telescopic tubes having longitudinal grooves which nest with each other (one tube is placed inside the other). The grooves of the inner tube have a different center of curvature and a different radius of curvature than those of the outer tube, causing the tubes to contact each other only along six longitudinal lines. An adjustable connector attached to the outer tube has a self-centering self-locking detent ball mechanism which cams the detenting balls inwardly to bear against the indents in the grooves of the innermost tube, and thereby lock its position relative to the outer tube.

The height of the gimbal on the post is made adjustable, for varied operating conditions. A course adjustment is provided by a ball and detent structure similar to that used to adjust and lock the extension post. A fine (micrometer) adjustment is additionally provided, which employs a threaded inner sleeve which can be manually adjusted (up and down) relative to an outer handle portion (to permit fine tuning of the gimbal location along the post).

To this end, and referring again to FIG. 13, an inner sleeve 212 is connected to a coarse locking ring 215, and is threadingly engaged with the pan handle. The inner sleeve is further fixed, at the desired fine adjustment of gimbal position, by a locking ring 213. Three balls 220 are cammed inwardly the ring 215, and provide self-centering angular contact with sets of spaced indents (not shown) in the grooved center post, to lock the coarse position of the gimbal.

Figure 14:
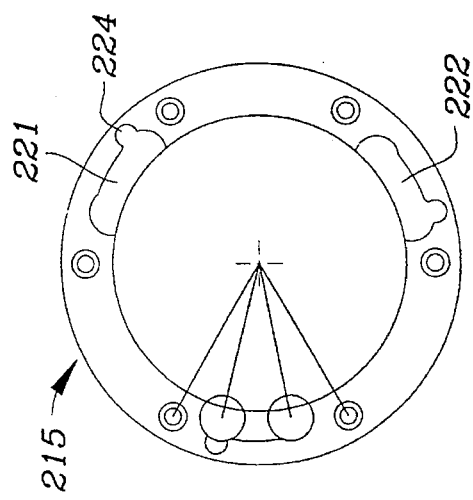
FIG. 14 is a top plan view of a cam lock for coarse adjustment of the gimbal mechanism of FIG. 13.

FIG. 14 shows a top view of the coarse locking ring 15, showing the three channels 221, 222, 223 that cam the balls (not shown) inwardly to engage the indents in the outer post as the ring is turned clockwise (in this view). When turned counter-clockwise, the balls are released from the tube by moving into the recesses 224.

Figure 15A:
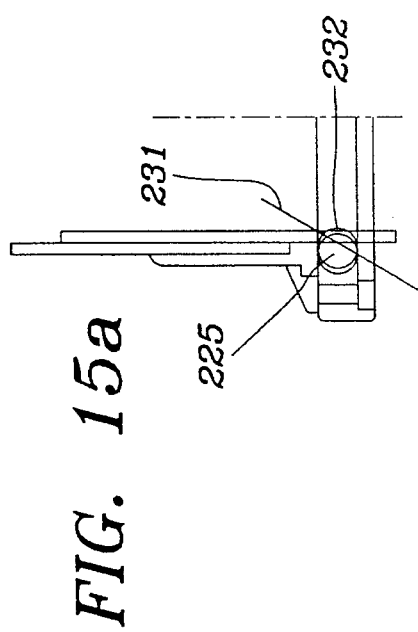
FIG. 15a is a partial sectional view showing the cam lock of FIG. 15.
Figure 15:
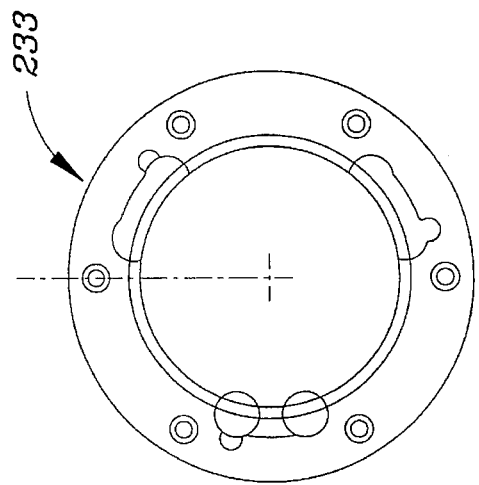
FIG. 15 is a top plan view of a cam lock for center post adjustment.

FIG. 15 shows a similar layout for the locking ring 233 connecting the inner and outer posts. FIG. 15a shows a side view of this structure, and the angular contact of the ball 225 with indent 232 (illustrated by the angled line 231). Note the increased size of the balls for this locking device as compared with those for locking the gimbal, to engage the larger indents formed in the larger grooves of the inner tube.

Figure 16:
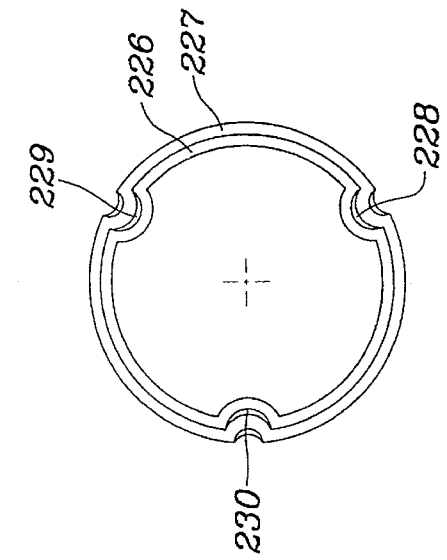
FIG. 16 is a cross-sectional view of the center post, showing a nested inner extension tube having complementary longitudinal grooves and spaced indents for receiving the locking and centering balls of the cam lock of FIG. 15.

FIG. 16 shows the nesting of the inner and outer tubes 226, 227. Illustrated are the six points of contact between the tubes, and the inner indents 228, 229, 230. To be noted is that similar sets of indents are provided along the tubes, at spaced intervals (e.g., at one-half inch spacings), to allow for coarse telescoping adjustment of the elements previously described.

The result is that for the first time, operators can extend the center post without tools, and instantly make required coarse adjustments and find a balanced gimbal position. The numerous shooting circumstances that call for fine bottom-heaviness adjustments can now be accommodated manually, precisely and repeatably, with the camera hanging in its normal upright position.

It will be understood that various changes in the details, materials and arrangement of parts which have been herein described and illustrated in order to explain the nature of this invention may be made by those skilled in the art within the principle and scope of the invention as expressed in the following claims.

What is claimed is:

1. In a mobile support system for receiving a plurality of elements during use, the support system including an elongated support body, a mounting assembly associated with a first end of the support body, for receiving an apparatus and for causing the apparatus to assume a selected attitude, means associated with a second end of the support body, for receiving components for use with the apparatus, and gimbal means associated with the support body at a position between the first end and the second end, for attaching the support body and the support system to a carrying system, the improvement which comprises:

an X-Y table associated with the mounting assembly, including automated driving means for moving the X-Y table; and means for automated control of operations of the driving means, wherein the control means is associated with the driving means to prevent an application of forces to the support system capable of altering the selected attitude of the apparatus.

2. The support system of claim 1 wherein the X-Y table includes screw drive means for separately moving the X-Y table in a first direction, and in a second direction perpendicular to the first direction.

3. The support system of claim 2 wherein the driving means for moving the X-Y table are motors coupled with the screw drive means of the X-Y table.

4. The support system of claim 3 which further includes adjustment knobs coupled with the screw drive means, for manually moving the X-Y table.

5. The support system of claim 3 which further includes sensor means for detecting the position of the X-Y table.

6. The support system of claim 5 wherein the sensor means is a linear potentiometer coupled with the screw drive means.

7. The support system of claim 1 wherein the control means is mechanically isolated from the driving means and the X-Y table.

8. The support system of claim 7 wherein the gimbal means includes an isolating mechanism attached to and between a first connector for engaging the support body and a second connector for engaging the carrying system, and wherein the control means is associated with the second connector of the gimbal means.

9. The support system of claim 8 wherein the control means is a dual axis switching device.

10. The support system of claim 8 wherein the support system further includes sensor means for detecting the position of the X-Y table, in operative association with the control means.

11. The support system of claim 8 wherein the support system further includes level sensing means associated with the driving means, for automatically leveling the support system.

12. The support system of claim 7 wherein the control means is coupled with the driving means by a wireless connection.

13. The support system of claim 7 wherein the control means is coupled with the driving means by a wireless connection.

14. The support system of claim 13 wherein the support system further includes sensor means for detecting the position if the X-Y table, in operative association with the control means.

15. The support system of claim 13 wherein the support system further includes level sensing means associated with the driving means, for automatically leveling the support system.

16. The support system of claim 1 wherein the control means is mechanically coupled with the driving means and the X-Y table.

17. The support system of claim 16 wherein the support system further includes sensor means for detecting the position of the X-Y table, in operative association with the control means.

18. The support system of claim 16 wherein the support system further includes level sensing means associated with the driving means, for automatically leveling the support system.

19. The support system of claim 1 wherein the apparatus is a camera.

20. The support system of claim 19 wherein the selected attitude assumed by the camera is controlled in pan, tilt and roll.

21. In a mobile support system for receiving a plurality of elements during use, the support system including an elongated support body, a mounting assembly associated with a first end of the support body, for receiving an apparatus and for causing the apparatus to assume a selected attitude, means associated with a second end of the support body, for receiving components for use with the apparatus and for placing the support system in dynamic balance, and gimbal means associated with the support body at a position between the first end and the second end, for attaching the support body and the support system to a carrying system, the improvement which comprises:

means associated with the second end of the support body, for coordinating movements of two of the components received by the support system so that movement of a first of the two components automatically causes a corresponding movement of a second of the two components, for maintaining the dynamic balance of the support system.

22. The support system of claim 21 wherein the first of the two components is positioned on one side of the support body, and the second of the two components is positioned on another, opposite side of the support body.

23. The support system of claim 22 wherein the first of the two components is caused to move along a first path and the second of the two components is caused to move along a second path, and wherein the first path and the second path are substantially co-planar with the support body.

24. The support system of claim 21 which further comprises means associated with the first end of the support body, for placing the support system in static balance.

25. The support system of claim 24 wherein the means for placing the support system in static balance is an adjustable X-Y table associated with the mounting assembly.

26. The support system of claim 25 which further includes driving means for moving the X-Y table, and means for automated control of operation of the driving means, wherein the control means is associated with the driving means to prevent an application of forces to the support system capable of altering the selected attitude of the apparatus.

27. The support system of claim 26 wherein the control means is mechanically isolated from the driving means and the X-Y table.

28. The support system of claim 27 wherein the gimbal means includes an isolating mechanism attached to and between a first connector for engaging the support body and a second connector for engaging the carrying system, and wherein the control means is associated with the second connector of the gimbal means.

29. The support system of claim 27 wherein the control means is coupled with the driving means by a wireless connection.

30. The support system of claim 21 wherein the first of the two components is carried by a first track and the second of the two components is carried by a second track, and wherein the first track and the second track are operatively coupled for corresponding movement.

31. The support system of claim 30 wherein the first track and the second track are operatively coupled by a cogged belt.

32. The support system of claim 31 which further includes a first extension post connecting the first of the two components and the first track, and a second extension post connecting the second of the two components and the second track, wherein the first extension post and the second extension post are operatively coupled with the first track and the second track for coordinated fore and aft movement responsive to movements of the first track and the second track.

33. The support system of claim 30 wherein the first track and the second track are operatively coupled so that the first of the two components and the second of the two components are moved in inverse proportion to the weight of the first of the two components relative to the weight of the second of the two components.

34. The support system of claim 30 wherein the first track and the second track are substantially co-planar with the support body, and parallel to an axis extending longitudinally along the mounting assembly, so that the first of the two components and the second of the two components are capable of corresponding forward and rearward movements for maintaining a selected rotational inertia for the support system.

35. The support system of claim 21 wherein the apparatus is a camera.

36. The support system of claim 35 wherein the first of the two components is a monitor for guiding the camera and the second of the two components is a battery for providing the camera with power.

37. In a mobile support system for receiving a plurality of elements during use, the support system including an elongated support body, a mounting assembly associated with a first end of the support body, for receiving an apparatus, means associated with a second end of the support body, for receiving components for use with the apparatus, and gimbal means associated with the support body at a position between the first end and the second end, for attaching the support body and the support system to a carrying system, the improvement which comprises:

means connecting the gimbal means with the support body, for adjustably and releasably positioning the gimbal means along the support body.

38. The support system of claim 37 wherein the connecting means includes a tubular element for surrounding the support body, and a releasable clamp for selectively engaging the tubular element with the support body.

39. The support system of claim 38 wherein the releasable clamp is a ball and detent structure.

40. The support system of claim 38 wherein the connecting means further includes a threaded engagement between the releasable clamp and the tubular element, for a vernier adjustment of the position of the connecting means relative to the support body.

41. The support system of claim 38 wherein the releasable clamp is self-centering.

42. The support system of claim 37 wherein the support body includes two telescoping members, and a releasable clamp for selectively engaging one of the two telescoping members relative to the other of the two telescoping members.

43. The support system of claim 42 wherein the gimbal means is coupled with an outermost one of the two telescoping members.

44. The support system of claim 42 wherein an outermost one of the two telescoping members has an inner surface and an innermost one of the two telescoping members has an outer surface, and wherein the inner surface and the outer surface include cooperating grooves for engaging each other.

45. The support system of claim 44 wherein the grooves of the inner surface are not coextensive with the grooves of the outer surface, so that contact between the grooves is limited to surface portions of the grooves.

46. The support system of claim 42 wherein the releasable clamp is a ball and detent structure.

47. The support system of claim 46 wherein the releasable clamp is self-centering.

48. The support system of claim 37 wherein the connecting means includes a tubular element for surrounding the support body, and wherein the gimbal means includes a yoke for engaging a trunnion associated with the tubular element, and a handle for engaging the carrying system and including an axially disposed bearing for receiving a pivot pin axially extending from the yoke.

49. The support system of claim 48 wherein the support system has a center of gravity, and wherein the yoke and the trunnion are positioned relative to the tubular element to allow the support body to be guided from a position adjacent to the center of gravity.

50. The support system of claim 48 wherein the gimbal means further includes a bearing surrounding the tubular element and connecting the tubular element with the support body, for permitting rotation of the connecting means about the support body.

51. The support system of claim 50 wherein the bearing is positioned above the trunnion associated with the tubular element.

52. The support system of claim 37 wherein the apparatus is a camera.

53. In a mobile support system for receiving a plurality of elements during use, the support system including an elongated support body, a mounting assembly associated with a first end of the support body, for receiving an apparatus and for causing the apparatus to assume a selected attitude, means associated with a second end of the support body, for receiving components for use with the apparatus and for placing the support system in dynamic balance, and gimbal means associated with the support body at a position between the first end and the second end, for attaching the support body and the support system to a carrying system, the improvement which comprises:

- an X-Y table associated with the mounting assembly, including automated driving means for moving the X-Y table;
- means for automated control of operations of the driving means, wherein the control means is associated with the driving means to prevent an application of forces to the support system capable of altering the selected attitude of the apparatus;
- means associated with the second end of the support body, for coordinating movements of two of the components received by the support system so that movement of a first of the two components automatically causes a corresponding movement of a second of the two components, for maintaining the dynamic balance of the support system; and
- means connecting the gimbal means with the support body, for adjustably and releasably positioning the gimbal means along the support body.

* * * * *